(12) United States Patent
Nakata et al.

(10) Patent No.: US 6,577,374 B1
(45) Date of Patent: Jun. 10, 2003

(54) ACTIVE MATRIX SUBSTRATE HAVING COLUMN SPACERS INTEGRAL WITH PROTECTIVE LAYER AND PROCESS FOR FABRICATION THEREOF

(75) Inventors: Shinichi Nakata, Tokyo (JP); Yuji Yamamoto, Tokyo (JP); Mamoru Okamoto, Tokyo (JP); Michiaki Sakamoto, Tokyo (JP); Hironori Kikkawa, Tokyo (JP); Muneo Maruyama, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 57 days.

(21) Appl. No.: 09/669,849

(22) Filed: Sep. 27, 2000

(30) Foreign Application Priority Data

Sep. 29, 1999 (JP) .............................................. 11-276012

(51) Int. Cl.⁷ ....................... G02F 1/1339; G02F 1/136; G02F 1/1333
(52) U.S. Cl. .......................... 349/156; 349/44; 349/138
(58) Field of Search ........................ 349/43, 106, 138, 349/44

(56) References Cited

U.S. PATENT DOCUMENTS

| | | | | |
|---|---|---|---|---|
| 5,917,572 A | * | 6/1999 | Kurauchi et al. | 349/156 |
| 6,181,406 B1 | * | 1/2001 | Morimoto et al. | 349/106 |
| 6,268,898 B1 | * | 7/2001 | Ihara | 349/139 |

FOREIGN PATENT DOCUMENTS

| | | |
|---|---|---|
| JP | 10-39292 | 2/1998 |
| JP | 10-68956 | 3/1998 |
| JP | 10-186379 | 7/1998 |

* cited by examiner

Primary Examiner—Toan Ton
(74) Attorney, Agent, or Firm—McGinn & Gibb, PLLC

(57) ABSTRACT

An active matrix substrate forms a liquid crystal display panel together with a counter substrate and liquid crystal filling a gap therebetween, and color filters are covered with an overcoat layer of photo-sensitive acrylic resin, wherein column spacers of the photo-sensitive acrylic resin project from the overcoat layer so that the column spacers are hardly separated from the overcoat layer in a rubbing for producing an orientation layer.

9 Claims, 21 Drawing Sheets

ACTIVE MATRIX SUBSTRATE HAVING COLUMN SPACERS INTEGRAL WITH PROTECTIVE LAYER AND PROCESS FOR FABRICATION THEREOF

FIELD OF THE INVENTION

This invention relates to an active matrix liquid crystal display panel and, more particularly, to an active matrix substrate incorporated in the active matrix liquid crystal display panel and a process for fabrication thereof.

DESCRIPTION OF THE RELATED ART

A typical example of the active matrix substrate is illustrated in FIGS. 1 and 2. In order to clearly show the layout of electrodes, insulating layers are removed from FIG. 1. The prior art active matrix substrate includes a transparent insulating plate 41. Conductive strips 42b are patterned on the major surface of the transparent insulating plate 41 at intervals, and extend in parallel in a direction of row. The conductive strips 42b serve as gate lines, and gate electrodes 42a project from the gate lines 42b. The gate electrodes 42a and the conductive strips 42b are covered with a gate insulating layer 43.

Although plural semiconductor layers 44 are formed on the gate insulating layer 43, only one semiconductor layer 44 is shown in FIG. 1, and the gate electrode 43 is overlapped with the semiconductor layer 44. The semiconductor layer 44 has a rectangular shape, and provides a channel region.

Conductive strips 46 are formed on the gate insulating layer 43 at intervals, and extend in parallel in a direction of column. The gate electrodes 42a and, accordingly, the semiconductor layers 44 are located between the adjacent two conductive strips 46. The conductive strips 46 serve as source lines, and source electrodes 46a project from the source lines 46. The source electrode 46a is held in contact with one end portion of the semiconductor layer 44 through an ohmic contact layer 45.

Although plural conductive layers are formed in regions each defined by the adjacent two source lines 46b and the adjacent two gate lines 42b, only one conductive layer 47 is shown in FIG. 1. The conductive layer 47 serves as a drain electrode, and is held in contact with the other end portion of the semiconductor layer 44 through an ohmic contact layer 45.

The gate electrode 42a, the gate insulating layer 43, the semiconductor layer 44, the source electrode 46a and the drain electrode 47 as a whole constitute a thin film filed effect transistor, and the thin film field effect transistor is covered with a passivation layer 48. A pixel electrode 49 is formed on the passivation layer 48, and the adjacent two source lines 46b and the adjacent two gate lines 42b are partially overlapped with the periphery of the pixel electrode 49. The pixel electrode 49 is formed of transparent conductive material. A contact hole 51 is formed in the passivation layer 48, and the pixel electrode 49 is held in contact with the drain electrode 47 through the contact hole 51. The source line 46b is electrically connected through the thin film field effect transistor to the pixel electrode 49.

The gate lines 42b are connected through contact holes formed in the gate insulating layer 43 to gate terminals 42c as shown in FIG. 3, and the source lines 46b are connected through contact holes formed in the passivation layer 48 to data terminals 46c as shown in FIG. 4. Driving signals are selectively applied to the gate terminals 42c, and video data signals are selectively applied to the data terminals 46c.

The thin film field effect transistor and the pixel electrode form a pixel together with a common electrode (not shown) and a piece of liquid crystal (now shown) between the pixel electrode 49 and the common electrode. The pixels are arranged in rows and columns, and are selectively energized for producing a picture on the active matrix liquid crystal display panel.

The driving signals are selectively propagated through the gate lines 42b to the gate electrodes 42a, and the associated thin film field effect transistors turn on so as to create conductive channels in the semiconductor layers 44. The video data signals are selectively supplied through the source lines to the source electrodes 46a, and reach the pixel electrodes 49 through the conductive channels. Thus, the electric charge is selectively accumulated in the pixel electrodes, and the charged pixel electrodes make the associated pieces of liquid crystal transparent. As a result, an image is produced on the matrix of pixels.

The prior art active matrix substrate is fabricated through a process described hereinbelow with reference to FIGS. 5A to 5K. The description is focused on the thin film field effect transistor, and the structure therearound.

The prior art process starts with preparation of the transparent insulting plate 41. Conductive metal such as Al, Mo or Cr is deposited to 100 nanometers to 400 nanometers thick over the major surface of the transparent insulating plate 41 by using sputtering. Photo-resist solution is spread over the entire surface of the conductive metal layer, and is baked. A pattern image of the gate lines/gate electrodes/gate terminals is transferred from a photo-mask to the photo-resist layer, and a latent image is produced in the photo-resist layer. The latent image is developed so as to form a photo-resist etching mask on the conductive metal layer. Thus, the photo-resist etching mask is formed through photo-lithographic techniques. Using the photo-resist etching mask, the conductive metal layer is selectively etched, and the gate lines/gate electrodes/gate terminals 42b/42a/42c are left on the major surface of the transparent insulating plate 41.

Subsequently, silicon nitride, amorphous silicon and heavily-doped n-type amorphous silicon are successively deposited over the entire surface of the resultant structure. The silicon nitride layer is 400 nanometers thick, and serves as the gate insulating layer 43. The amorphous silicon layer and the heavily-doped n-type amorphous silicon layer are 300 nanometers thick and 50 nanometers thick, respectively. A photo-resist etching mask (not shown) is patterned on the heavily-doped n-type amorphous silicon layer by using the photo-lithographic techniques, and the amorphous silicon layer and the heavily-doped n-type amorphous silicon layer are selectively etched. Upon completion of the etching, the amorphous silicon layer is patterned into the semiconductor layer 44, and the heavily-doped n-type amorphous silicon layer is laminated on the semiconductor layer 44.

Subsequently, conductive metal such as Mo or Cr is deposited to 100 nanometers to 200 nanometers thick over the entire surface of the resultant structure by using the sputtering technique, and a photo-resist etching mask (not shown) is patterned on the conductive metal layer by using the photo-lithographic techniques. Using the photo-resist etching mask, the conductive metal layer is selectively etched so as to form the source lines/source electrodes/drain electrodes/data terminals 46b/46a/47/46c on the gate insulating layer 43. The heavily-doped n-type amorphous silicon layer is partially overlapped with the source electrode 46a and the drain electrode 47.

Using the source/drain electrodes 46a/47 as an etching mask, the exposed portion of the heavily-doped n-type amorphous silicon layer is etched away, and the back channel region is exposed. The source electrode 46a and the drain electrode 47 are electrically connected through the ohmic layers 45 to the semiconductor layer 44 as shown in FIG. 5A.

Subsequently, silicon nitride is deposited to 100 nanometers to 200 nanometers thick over the entire surface of the resultant structure by using a plasma-assisted chemical vapor deposition. The silicon nitride layer serves as the passivation layer 48.

A photo-resist etching mask (not shown) is patterned on the passivation layer 48. Using the photo-resist etching mask, the contact hole 51, the contact hole for the data terminal 46c and the contact hole for the gate terminal 42c are formed in the passivation layer 48. The resultant structure is shown in FIG. 5B.

Transparent conductive material is deposited over the entire surface of the resultant structure. A photo-resist etching mask (not shown) is patterned on the transparent conductive layer by using the photo-lithographic techniques, and the transparent conductive layer is selectively etched away so as to from the pixel electrode 49 as shown in FIG. 5C.

The photo-lithography is repeated five times in the prior art fabrication process until completion of the prior art active matrix substrate. A counter substrate is prepared. The common electrode and color filters are formed on the counter substrate. The active matrix substrate is assembled with the counter substrate, and liquid crystal is sealed in the gap between the active matrix substrate and the counter substrate.

The region defined by the adjacent two gate lines 42b and the adjacent two source lines 46b is imperfectly covered with the pixel electrode 49 as will be understood from FIG. 1. Back light is leaked through the uncovered area, and makes the contrast of the image poor. A photo-shield photo-shield black matrix is effective against the leakage light. Misalignment between the photo-shield photo-shield black matrix and the prior art active matrix substrate is to be taken into account. The photo-shield photo-shield black matrix is enlarged, and occupies wide area. This means that the shield area is not ignoreable. Thus, a problem is encountered in the prior art active matrix substrate in a small aperture ratio.

A solution of the problem is disclosed in Japanese Patent Publication of Unexamined Application No. 10-39292. A color filter substrate is laminated on the active matrix substrate, and the prior art structure is called as "CF-on-TFT structure (Color Filter on Thin Film Transistor structure)". The prior art CF-on-TFT structure is introduced as the first embodiment in the Japanese Patent Publication of Unexamined Application, and is hereinbelow described as the second prior art. Although the Japanese Patent Publication of Unexamined Application does not teach the complete process for fabricating the second prior art, the second prior art would be fabricated as follows.

FIGS. 6A to 6H illustrate the process for fabricating the second prior art. Firstly, thin film transistors 70a are fabricated on the transparent insulating plate 71, and, thereafter, covered with the passivation layer 78 as shown in FIG. 6A. The gate insulating layer, the gate electrode, the source electrode and the drain electrode are labeled with references "73", "72a", "76a" and "77", respectively.

Subsequently, pigment dispersed photo-sensitive resin is spun onto the resultant structure. The spin coater is regulated in such a manner that the pigment dispersed photo-sensitive resin layer is 1.5 microns thick. The pigment dispersed photo-sensitive resin layer is patterned through the photolithography, and a photo-shield photo-shield black matrix 85 is left on the passivation layer 78 as shown in FIG. 6B. The contact hole forming area, the thin film field effect transistors 70a and the gate lines are covered with the photo-shield photo-shield black matrix 85 as shown in FIG. 6B.

Subsequently, ultra-violet light is radiated for cleaning and reforming the surface. Red pigment dispersed photo-sensitive resin is spun onto the resultant structure. The spin coater is regulated in such a manner that the red pigment dispersed photosensitive resin layer is 1.2 microns thick. Red filters 83a are patterned from the red pigment dispersed photosensitive resin layer by using the photo-lithography. The red filters 83a fill selected spaces in the photo-shield photo-shield black matrix 85 as shown in FIG. 6C.

Subsequently, ultra-violet light is radiated for cleaning, again. Green pigment dispersed photosensitive resin is spun onto the resultant structure. The spin coater is regulated in such a manner that the green pigment dispersed photosensitive resin layer is 1.2 microns thick. Green filters 83b are patterned from the green pigment dispersed photosensitive resin layer by using the photo-lithography. The green filters 83b fill other spaces in the photo-shield photo-shield black matrix 85 as shown in FIG. 6D.

Subsequently, ultra-violet light is radiated for cleaning, again. Blue pigment dispersed photosensitive resin is spun onto the resultant structure. The spin coater is regulated in such a manner that the blue pigment dispersed photosensitive resin layer is 1.2 microns thick. Blue filters 83c are patterned from the blue pigment dispersed photosensitive resin layer by using the photo-lithography. The blue filters 83c fill the remaining spaces in the photo-shield photo-shield black matrix 85 as shown in FIG. 6E. FIG. 6E shows a cross section taken along a line different from that used for the cross section shown in FIG. 6D.

Subsequently, photosensitive acrylic resin is spun onto the resultant structure. The photo-sensitive acrylic resin forms an over-coating layer 84 of 3 microns thick. The over-coating layer 84 creates a smooth surface. Contact holes 81 are formed in the over-coating layer 84 by using the photo-lithography as shown in FIG. 6F.

Subsequently, positive photo-resist is spun onto the over-coating layer 84. The positive photo-resist is in the novolak system. The positive photo-resist layer is patterned into a photo-resist etching mask 87 by using the photo-lithographic techniques. Using the photo-resist etching mask, the photo-shield photo-shield black matrix 85 and, thereafter, the passivation layer 78 are partially etched away so that the contact hole 81 reaches the drain electrode 77 as shown in FIG. 6G.

Finally, transparent conductive material is deposited over the entire surface of the resultant structure by using a sputtering. A photo-resist etching mask (not shown) is patterned through the photo-lithographic techniques, and the transparent conductive material layer is formed into the pixel electrodes 79. The pixel electrode 79 extends along the inner surface defining the contact hole 81, and is held in contact with the drain electrode 77. Thus, the pixel electrode 79 is connected through the thin film field effect transistor 70a to the associated source line.

The second prior art active matrix substrate enhances the aperture ratio, and is desirable for a large-sized active matrix liquid crystal display panel. Spherical spacers are randomly dispersed on the second prior art active matrix substrate, and the second prior art active matrix substrate is assembled with a counter substrate. The spherical spacers form a gap between the second prior art active matrix substrate and the counter substrate, and liquid crystal fills the gap. The manufacturer can not precisely control the gap with the spherical spacers. For this reason, Japanese Patent Publication of Unexamined Application No. 10-68956 proposes to replace the spherical spacers with plural column spacers. Although the Japanese Patent Publication of Unexamined Application does not teach a complete process sequence, the column spacers would be fabricated through a process shown in FIGS. 7A to 7C. The active matrix substrate fabricated through the process is described hereinbelow as the third prior art active matrix substrate.

The thin film transistor 110*a* is fabricated on the transparent insulating plate 111, and is covered with the passivation layer 118. The gate electrode, the gate insulating layer, the semiconductor layer, the source electrode and the drain electrode are labeled with references "112*a*", "113", "114", "116*a*" and "117", respectively. A photo-shield photo-shield black matrix 125 is formed over the thin film field effect transistors 110*a* as similar to the second prior art active matrix substrate.

Pigment dispersed photo-sensitive red color resist is spun onto the resultant structure. A photo-mask is aligned with the resultant structure such that parts of the pigment dispersed photo-sensitive red color resist layer for column spacers and red filters are irradiated with 365 nm wavelength light. The 365 nm wavelength light is radiated through the photo-mask to the parts of the pigment dispersed photo-sensitive red color resist layer at 100 mJ/cm$^2$. The latent image is developed in solution containing KOH at 1% for 10 minutes. Then, the red filters 123*a* and lower parts 123*a*' of the column spacers are formed as shown in FIG. 7A.

Subsequently, pigment dispersed photo-sensitive green color resist is spun onto the resultant structure, and green filters 123*b* and intermediate parts 123*b*' of the column spacers are formed as similar to the lower part 123*a*' and the red filters 123*a*. The resultant structure is shown in FIG. 7B.

Subsequently, pigment dispersed photo-sensitive blue color resist is spun onto the resultant structure, and blue filters 123*c* and upper parts 123*c*' of the column spacers are formed as similar to the red filters 123*a* and the lower part 123*a*'.

Black resin layer is patterned in such a manner as to correspond to the thin film field effect transistors, and the column spacers are completed over the photo-shield photo-shield black matrix 125. The red/green/blue filters 123*a*/123*b*/123*c* and the passivation layer 118 thereunder are selectively removed so as to form contact holes 121. Transparent conductive material such as ITO is deposited over the entire surface of the resultant structure, and the transparent conductive layer is patterned into pixel electrodes 119. The pixel electrode 119 penetrates through the contact hole 121, and is held in contact with the drain electrode 117 of the associated thin film field effect transistor 110*a* as shown in FIG. 7C.

The lower/intermediate/upper parts 123*a*'/123*b*'/123*c*' are patterned together with the color filters 123*a*/123*b*/12*c*, and the column spacers are exactly adjusted to a target height. In other words, the total thickness of the red/green/blue filters 123*a*/13*b*/123*c* is proportional to the height of the column spacers. This means that the thickness of the red/green/blue filters 123*a*/123*b*/123*c* are dominated by the gap to be created between the third prior art active matrix substrate and the counter substrate. Even if the red/green/blue filters are to be thicker than the red/green/ blue filters 123*a*/123*b*/123*c* are, it is impossible to employ the thick red/green/blue filters in the third active matrix substrate. As a result, the prior art active matrix liquid crystal display panel fails to realize the chromaticity to be requested.

The problem inherent in the third prior art active matrix substrate is the undesirable linkage between the height of the column spacers and the thickness of the filters 123*a*/123*b*/123*c*. A solution is proposed in Japanese Patent Publication of Unexamined Application No. 10-186379. The active matrix substrate disclosed in the Japanese Patent Publication of Unexamined Application is hereinbelow referred to as "fourth active matrix substrate", and the fourth active matrix substrate is to be fabricated through a process shown in FIGS. 8A to 8F.

Thin film filed effect transistors 150*a* are fabricated over a transparent insulating substrate 151. The thin film field effect transistor 150*a* includes a gate electrode 152*a* connected to an associated gate line, a gate insulating layer 153, a semiconductor layer 154, a source electrode 156*a* connected to a source line and a drain electrode 157. The thin film field effect transistors 150*a* and exposed area of the gate insulating layer 153 are covered with an overcoat layer 164. The resultant structure is shown in FIG. 8A.

The resultant structure is subjected to the cleaning with ultra-violet light. Pigment dispersed photo-sensitive red color resist is spun onto the overcoat layer 164. The spin coater is regulated in such a manner that the pigment dispersed photo-sensitive red color resist layer is 1.2 microns thick. The pigment dispersed photo-sensitive red color resist layer is patterned into red color filters 163*a* through the photo-lithography as shown in FIG. 8B.

Subsequently, the resultant structure is subjected to the cleaning with ultra-violet light. Pigment dispersed photo-sensitive green color resist is spun onto the overcoat layer 164. The spin coater is regulated in such a manner that the pigment dispersed photo-sensitive green color resist layer is 1.2 microns thick. The pigment dispersed photo-sensitive green color resist layer is patterned into green color filters 163*b* through the photo-lithography as shown in FIG. 8C. The red filters 163*a* are not overlapped with the green filters 163*b*, but the red filters 163*a* and the green filters 163*b* are continued on the overcoat layer 164.

Subsequently, the resultant structure is subjected to the cleaning with ultra-violet light. Pigment dispersed photo-sensitive blue color resist is spun onto the overcoat layer 164. The spin coater is regulated in such a manner that the pigment dispersed photo-sensitive blue color resist layer is 1.2 microns thick. The pigment dispersed photo-sensitive blue color resist layer is patterned into blue color filters 163*c* through the photo-lithography as shown in FIG. 8D. The red/green filters 163*a*/163*b* are not overlapped with the blue filters 163*c*, but the red/green/blue filters 163*a*/163*b*/163*c* are continued on the overcoat layer 164.

Subsequently, contact holes 161 are formed in the red/green/blue filters 163*a*/163*b*/163*c* and the overcoat layer 164, and the drain electrodes 157 are exposed to the contact holes 161, respectively. The resultant structure is shown in FIG. 8E.

Subsequently, transparent conductive material is deposited over the entire surface of the resultant structure by using the sputtering, and the transparent conductive layer is patterned into pixel electrodes 159 through the photo-lithography followed by etching. The pixel electrodes 159 penetrate through the contact holes 161, and are held in contact with the drain electrodes 157, respectively.

Finally, black resin is spread over the entire surface of the resultant structure, and the black resin layer is patterned into a photo-shield black pattern 165. The photo-shield black pattern 165 is located over the thin film field effect transistors 150a, and serves as column spacers. Thus, the photo-shield black pattern 165 is independent of the red/green/blue filters 163a/163b/164c. For this reason, the red/green/blue filters 163a/163b/163c and the photo-shield black pattern 165 are designed to have an appropriate thickness and an appropriate height, independently.

The fourth prior art active matrix substrate is free from the problems inherent in the first to third prior art active matrix substrates. However, a problem is encountered in the fourth prior art active matrix substrate in that the photo-shield black pattern or the column spacers are liable to be separated from the red/green/blue filters 163a/163b/163c during the rubbing on an orientation layer. The separation is due to poor adhesion between the photo-shield black pattern and the red/green/blue filters 163a/163b/163c, and the coloring agent in the photo-shield black pattern is causative of the poor adhesion. In case where the photo-shield black pattern is formed of black pigment dispersed resin, the black pigment is the coloring agent. A photo-shield black pattern is formed of carbon-containing resin. The carbon particles are the coloring agent.

SUMMARY OF THE INVENTION

It is therefore an important object of the present invention to provide an active matrix substrate, which has column spacers for adjusting a gap to appropriate height without separation, deviation from target chromaticity and leakage light.

It is also an important object of the present invention to provide a process for fabricating the active matrix substrate.

To accomplish the object, it is proposed to form at least one protrusion integral with a remaining portion of a protective layer.

In accordance with one aspect of the present invention, there is provided an active matrix substrate forming parts of a display panel together with a counter substrate comprising a plate having a major surface, a multiple layered device structure laminated on the major surface and including conductive layers forming parts of pixels, an optically modulating structure laminated on the multiple layered device structure and including color filters, and a protective structure laminated on the optically modulating structure and including a protective layer formed of photo-sensitive material and having at least one protrusion projecting from a remaining portion thereof toward an inner surface of the counter substrate.

In accordance with another aspect of the present invention, there is provided a process for fabricating an active matrix substrate comprising the steps of a) preparing a plate having a major surface, b) laminating a multiple layered device structure on the major surface for providing conductive layers forming parts of pixels, c) laminating an optically modulating structure on the multiple layered device structure for providing color filters to the parts of the pixels, d) covering the optically modulating structure with a photo-sensitive layer, e) exposing the photo-sensitive layer to an image-carrying light for producing at least two portions different in solubility to a developer, f) treating the photo-sensitive layer with the developer so as to form a protective layer having at least one protrusion projecting from a remaining portion thereof and g) completing the active matrix substrate.

BRIEF DESCRIPTION OF THE DRAWINGS

The features and advantages of the active matrix substrate and the process will be more clearly understood from the following description taken in conjunction with the accompanying drawings in which.

DESCRIPTION OF THE PREFERRED EMBODIMENTS

First Embodiment

Figure 1:
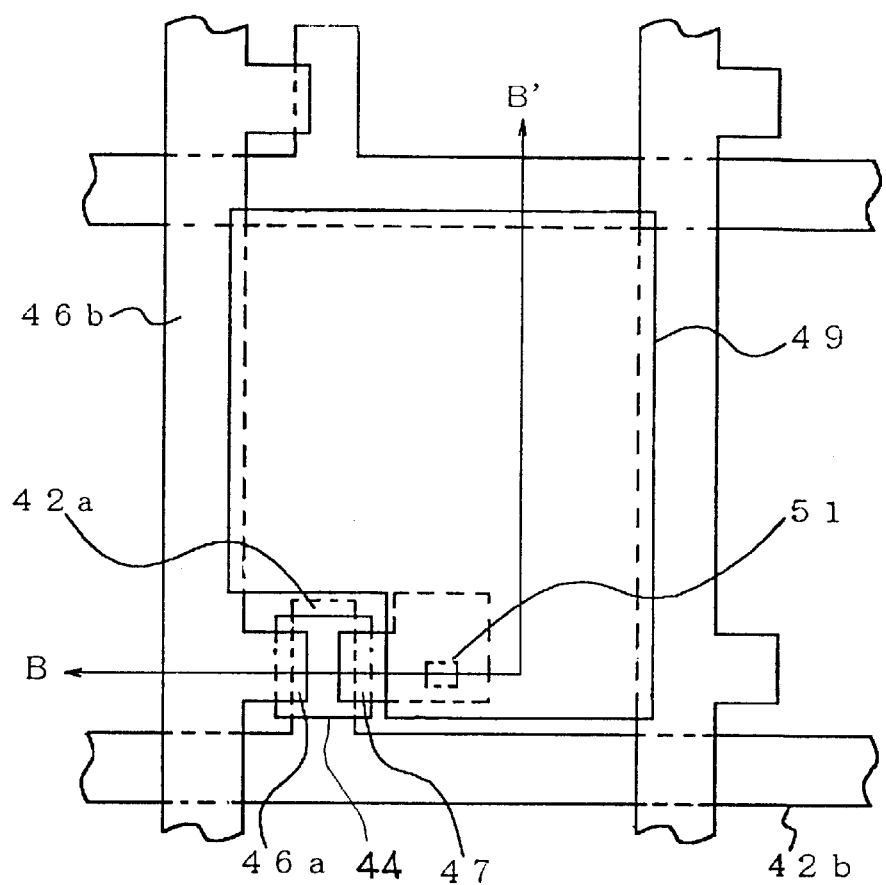
FIG. 1 is a plane view showing the layout on the prior art active matrix substrate.
Figure 2:
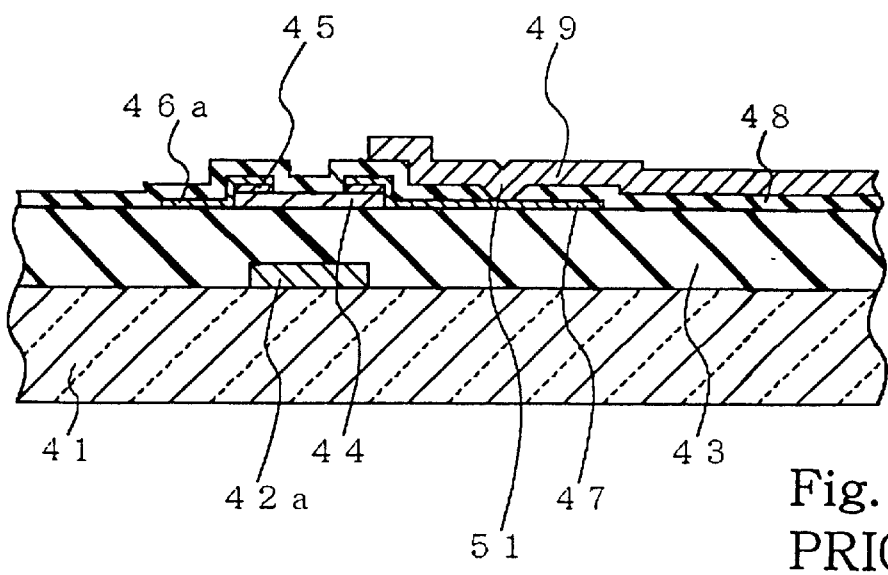
FIG. 2 is a cross sectional view taken along line B–B' of FIG. 1 and showing the structure of the prior art active matrix substrate.
Figure 3:
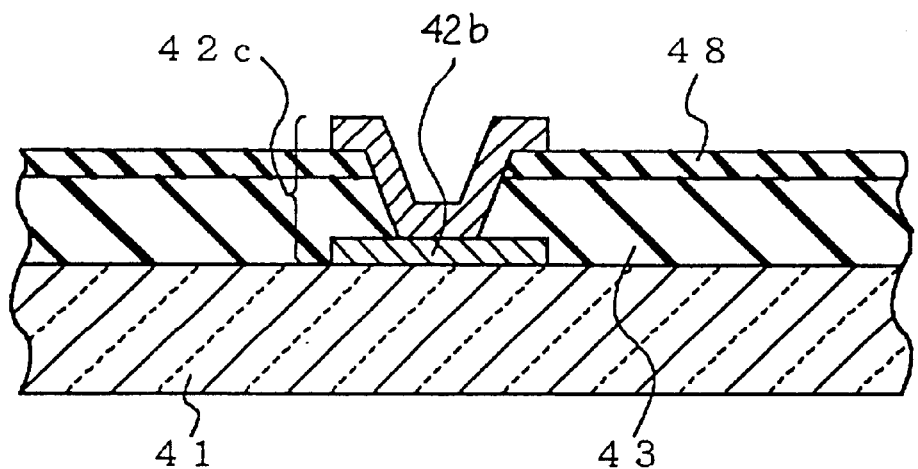
FIG. 3 is a cross sectional view showing the structure of the gate terminal incorporated in the prior art active matrix substrate.
Figure 4:
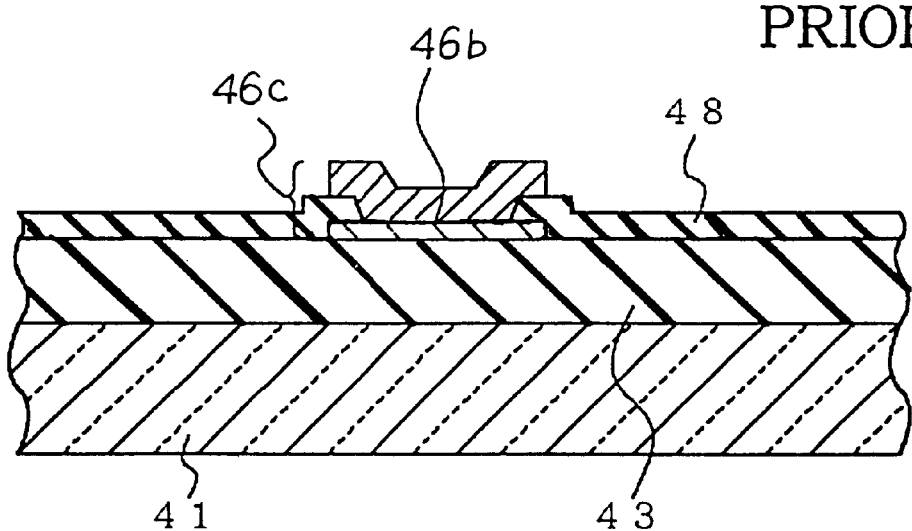
FIG. 4 is a cross sectional view showing the structure of the data terminal incorporated in the prior art active matrix substrate.
Figure 5A:
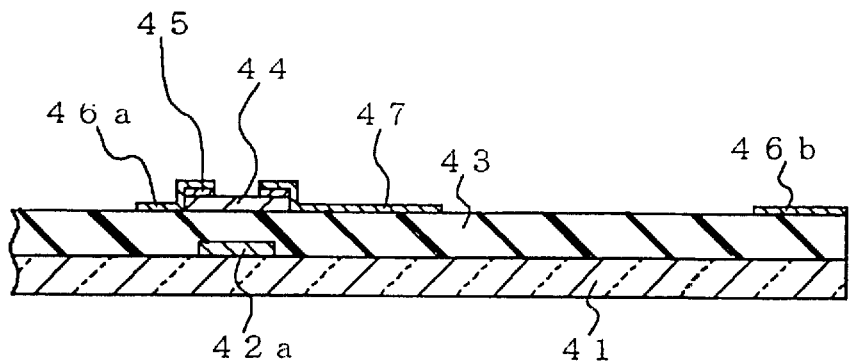
FIGS. 5A to 5C are cross sectional views showing the process for fabricating the prior art active matrix substrate.
Figure 5B:
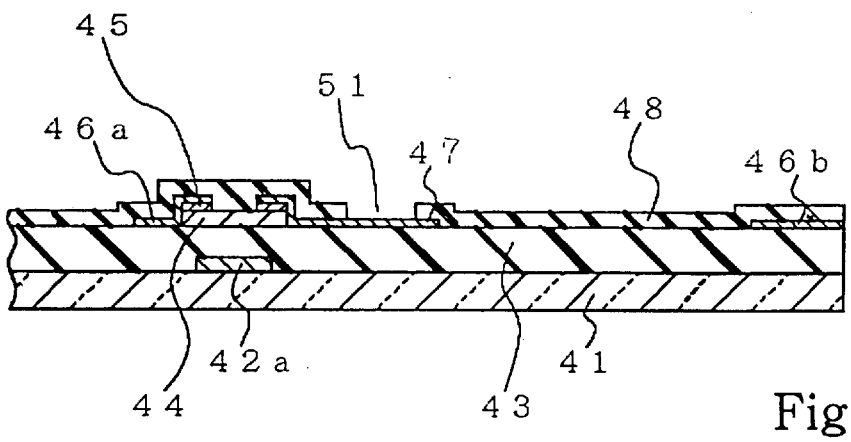
Figure 5C:
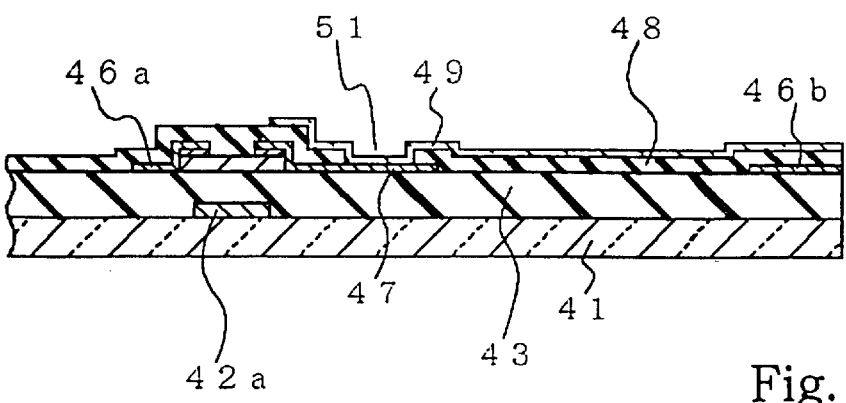
Figure 6A:
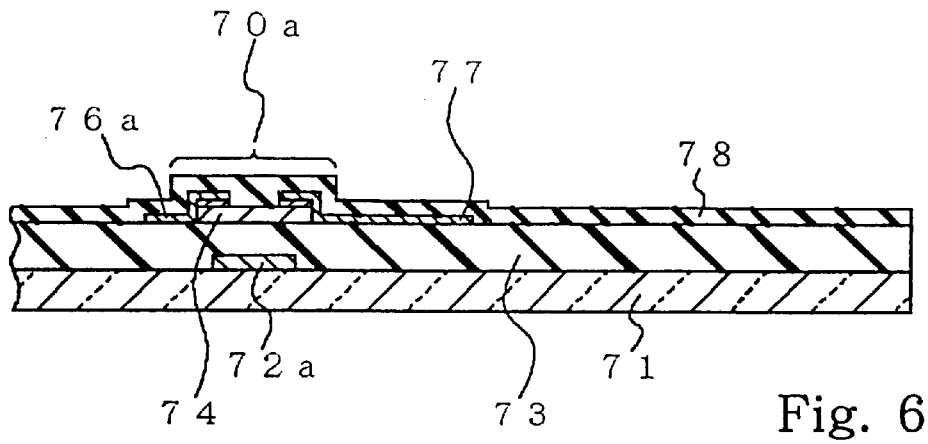
FIGS. 6A to 6H are cross sectional views showing the process for fabricating the second prior art active matrix substrate.
Figure 6B:
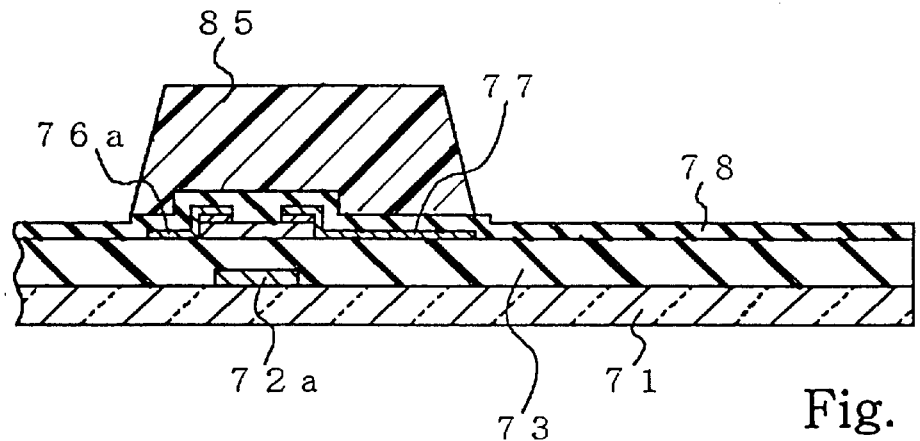
Figure 6C:
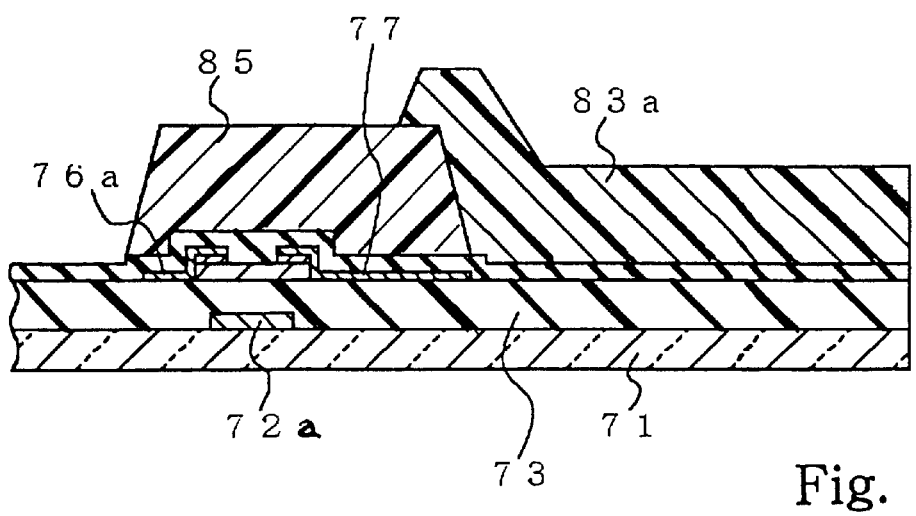
Figure 6D:
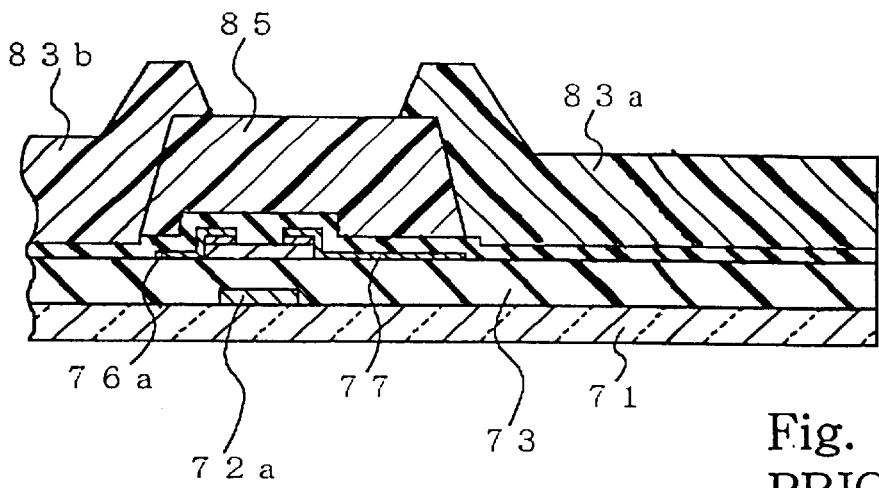
Figure 6E:
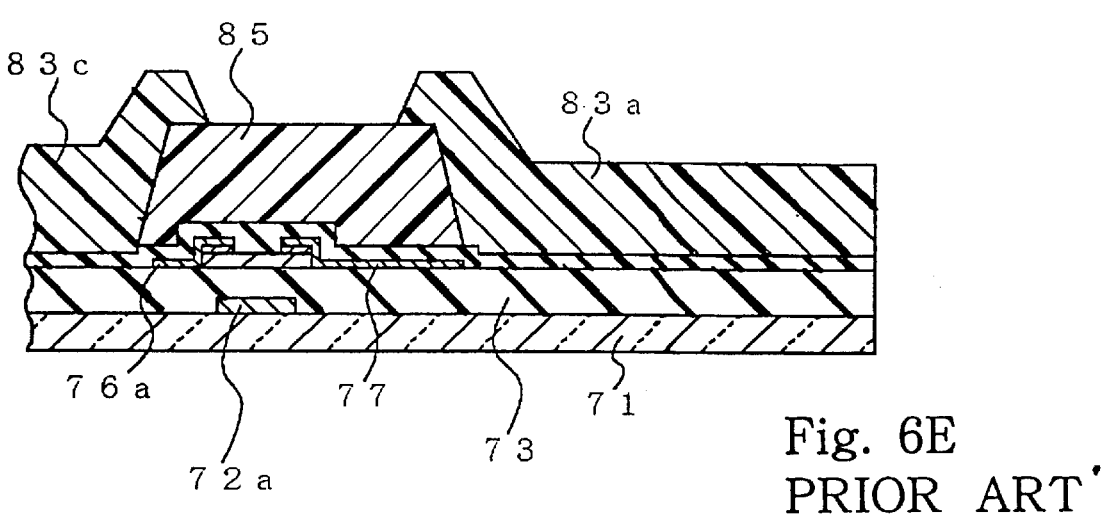
Figure 6F:
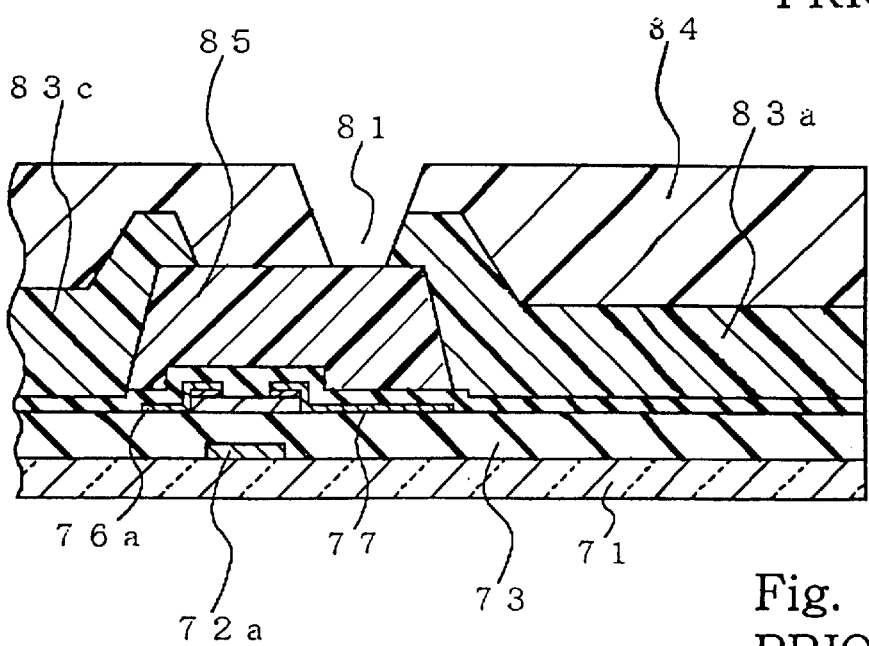
Figure 6G:
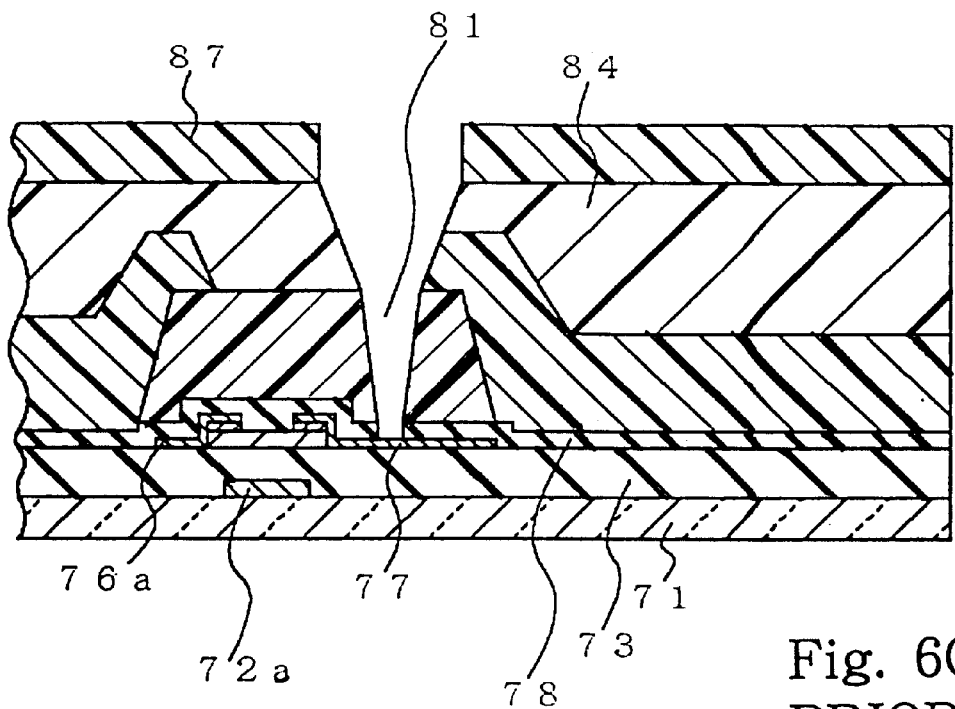
Figure 6H:
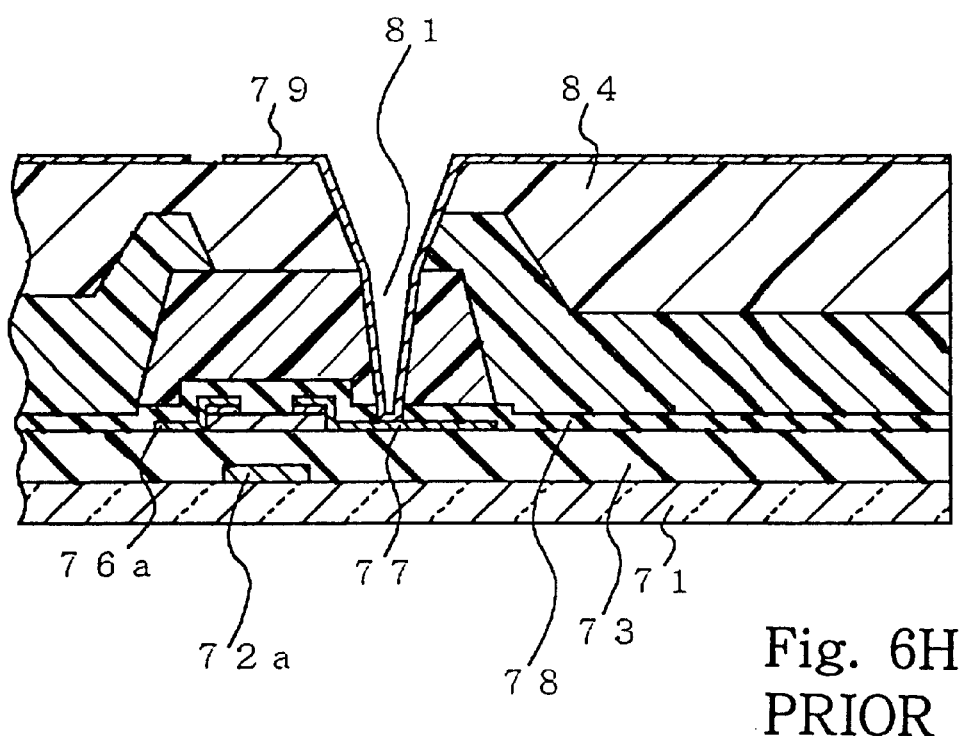
Figure 7A:
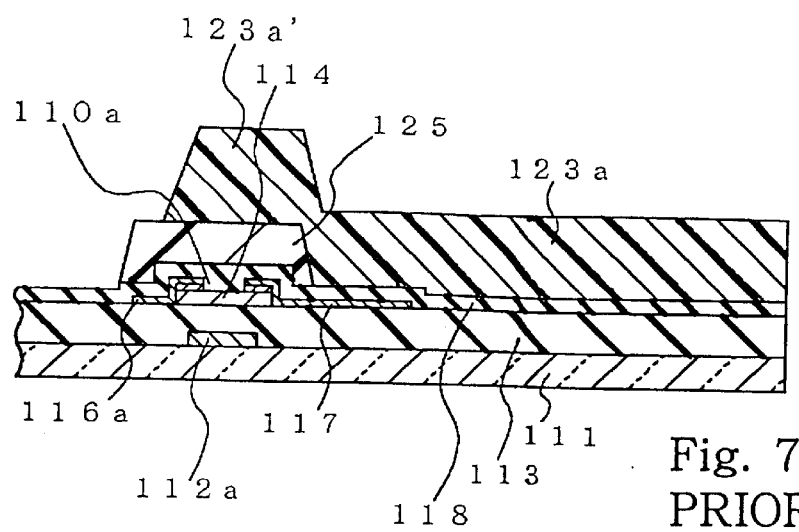
FIGS. 7A to 7C are cross sectional views showing the process for fabricating the third prior art active matrix substrate.
Figure 7B:
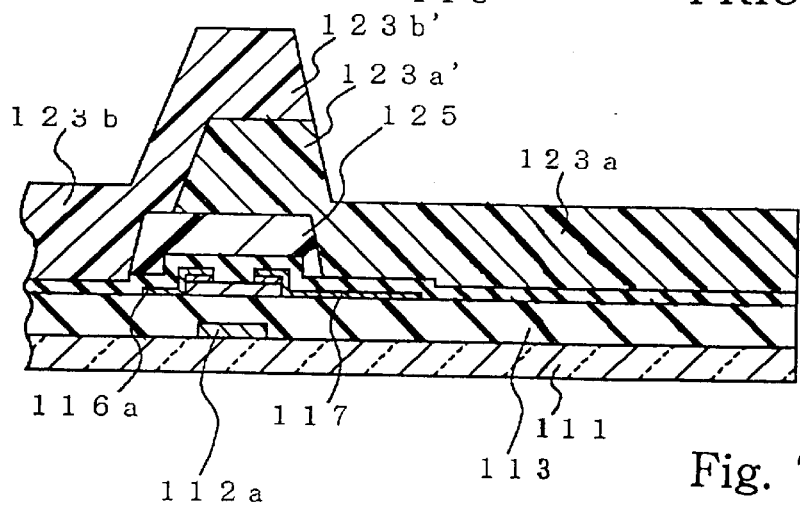
Figure 7C:
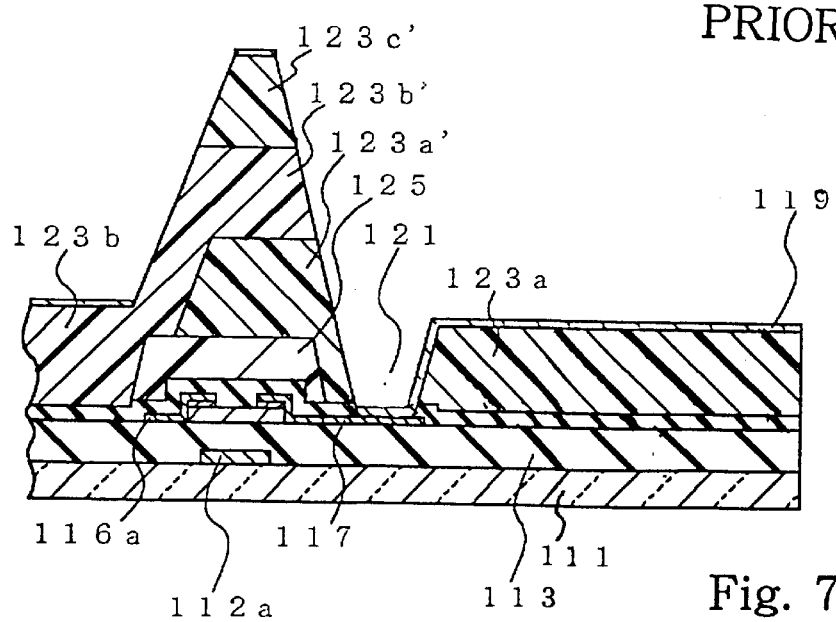
Figure 8A:
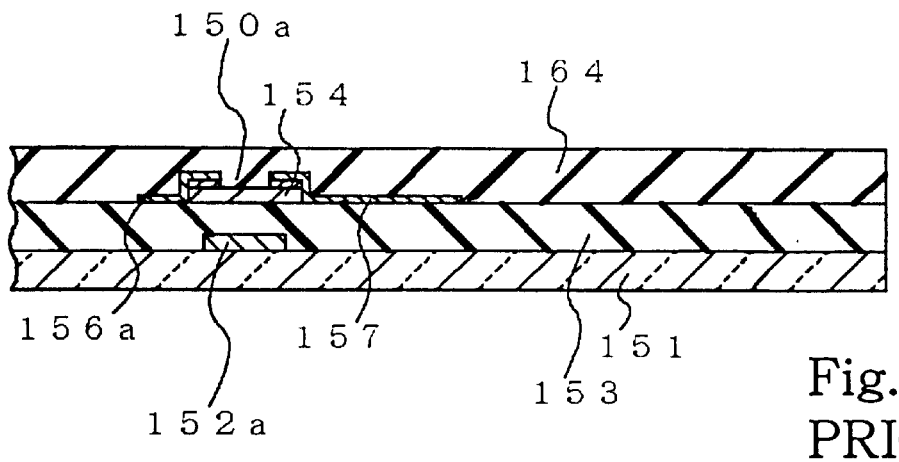
FIGS. 8A top 8F are cross sectional views showing the process for fabricating the fourth prior art active matrix substrate.
Figure 8B:
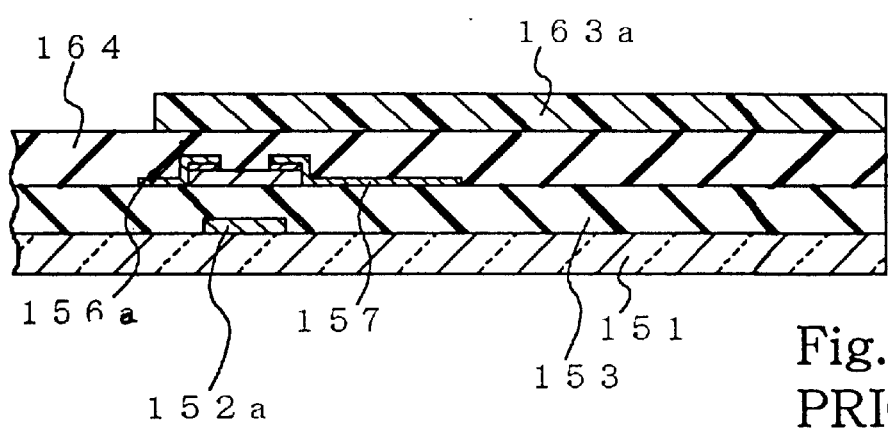
Figure 8C:
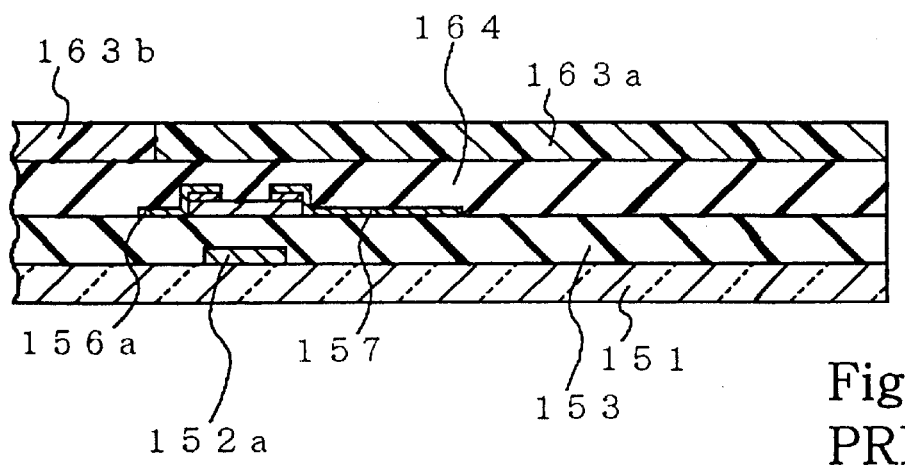
Figure 8D:
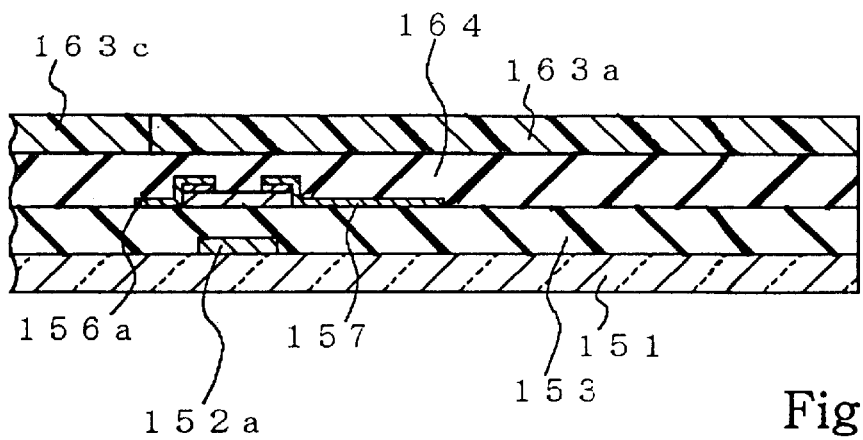
Figure 8E:
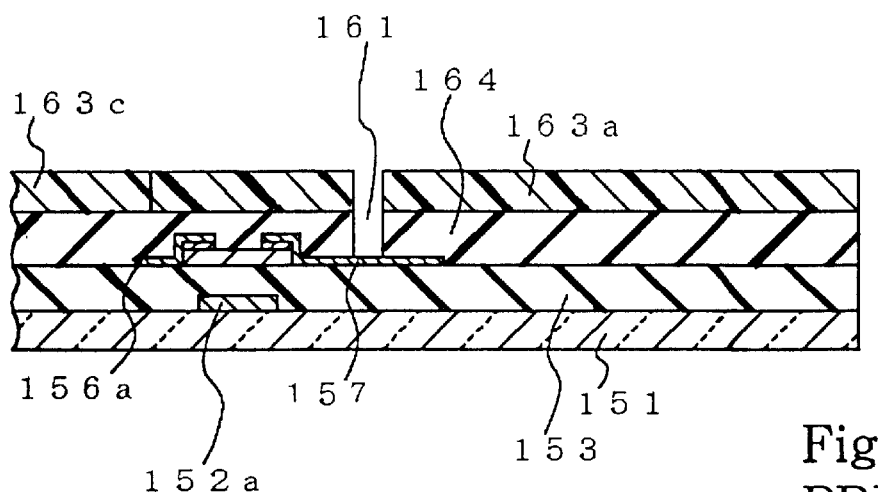
Figure 8F:
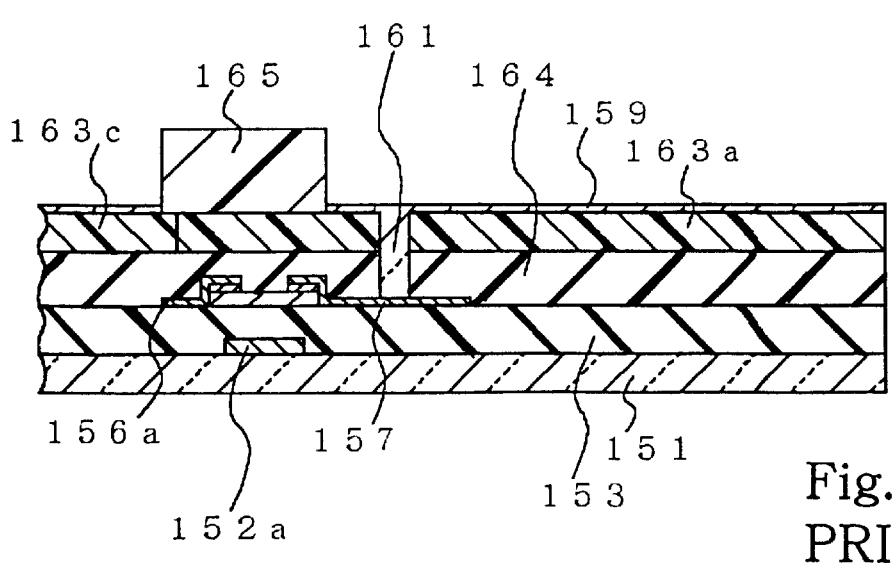
Figure 9:
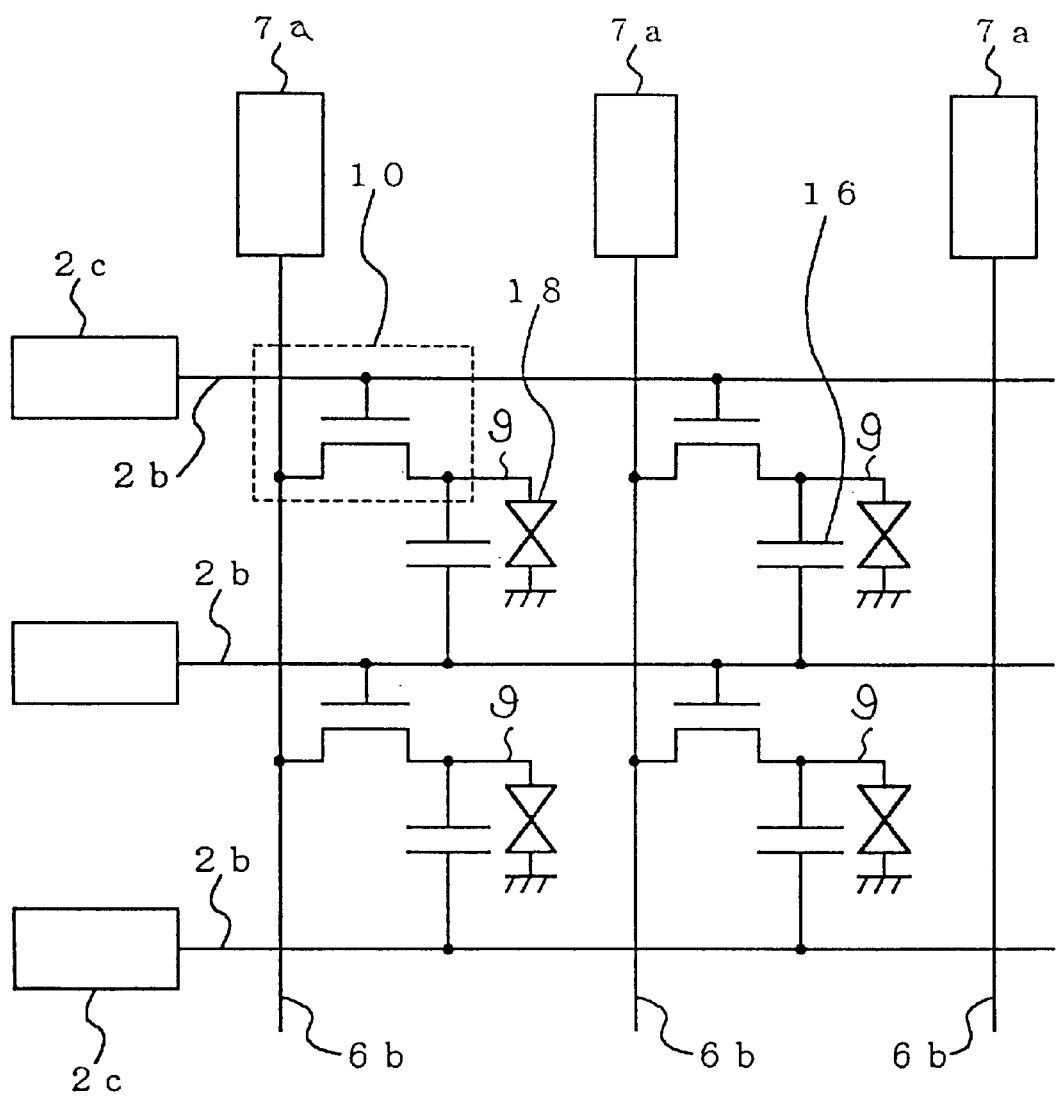
FIG. 9 is a circuit diagram showing the circuit configuration of an active matrix liquid crystal display panel according to the present invention.

Referring to FIG. 9 of the drawings, an active matrix liquid crystal display according to the present invention largely comprises an active matrix substrate, a counter substrate EL (see FIG. 12) and liquid crystal 18. The counter substrate is spaced from the active matrix substrate, and the liquid crystal 18 fills the gap between the active matrix substrate and the counter substrate. There is not any limit to the structure of the counter substrate and the sort of liquid crystal.

Gate lines 2b, source lines 6b, thin film field effect transistors 10 and pixel electrodes 9 are incorporated in the active matrix substrate. The gate lines 2b are respectively connected to gate terminals 2c, and provide gate electrodes 2a (see FIGS. 10 to 12) for thin film field effect transistors 10. The source lines 6b are respectively connected to data terminals 7a, and provide source electrodes 6a (see FIGS. 10 to 12) for the thin film field effect transistors 10. The pixel electrodes 9 are electrically connected to drain electrodes of the thin film field effect transistors 10. The thin film field effect transistor 10 is connected in series to the pixel electrode 9, and the thin film field effect transistor 10, the pixel electrode 9, part of the liquid crystal 18 form in combination a pixel together with a counter electrode on the counter substrate. Plural pixels are arranged in matrix. Each of the pixels is selectable from the matrix by driving the associated gate/source lines. The pixel electrodes 9 are partially overlapped with the adjacent gate lines 2b, and the part of the pixel electrodes 9, the parts of the adjacent gate lines 2b and a gate insulating layer 3 (see FIG. 12) form in combination pixel capacitors 16.

Scanning signals are selectively applied to the gate terminals 2c, and reach the gate electrodes of the thin film field effect transistors 10 connected to the selected gate terminals 2c. The scanning signals make the thin film field effect transistors 10 turn on, and the pixel electrodes 9 are connected through the thin film field effect transistors 10 to the associated source lines 6b. Data signals, which carry an image, are selectively applied to the data terminals 7a, and reach the pixel electrodes 9 through the source lines 6b and the selected thin film field effect transistors 10. The data signals make the parts of the liquid crystal 18 transparent, and back light passes through the parts of the liquid crystal 18. Then, the image is produced on the active matrix liquid crystal display.

Figure 10:
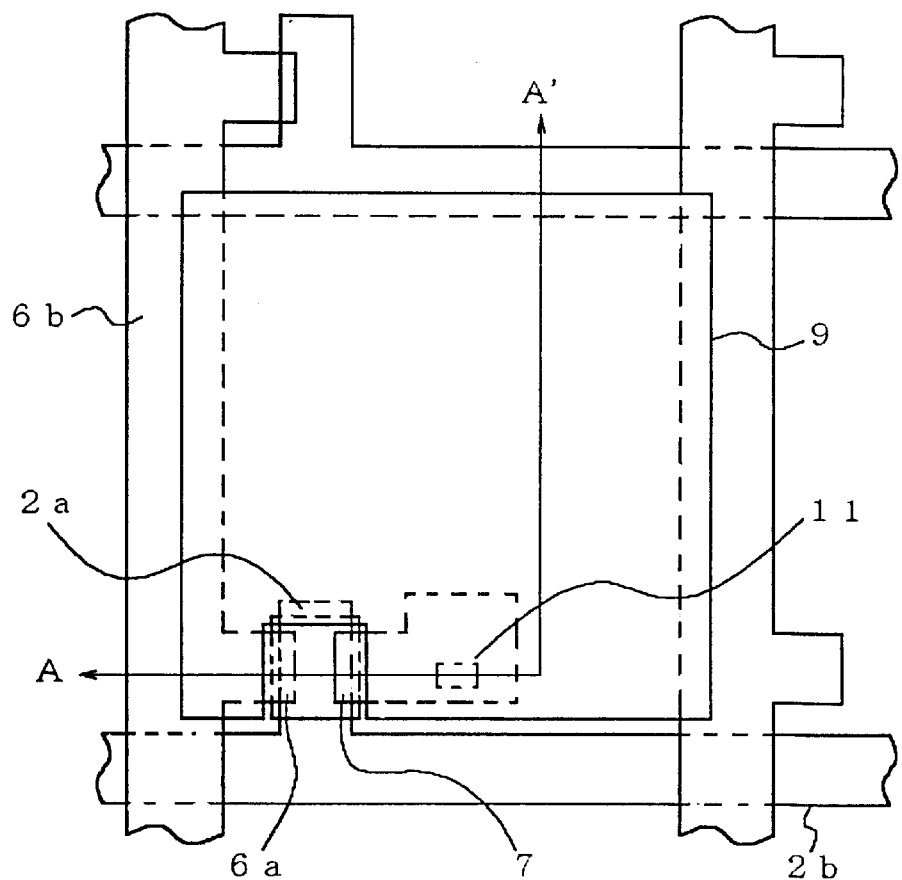
FIG. 10 is a plane view showing the layout of signal lines and electrodes on an active matrix substrate forming a part of the active matrix liquid crystal display panel.
Figure 11:
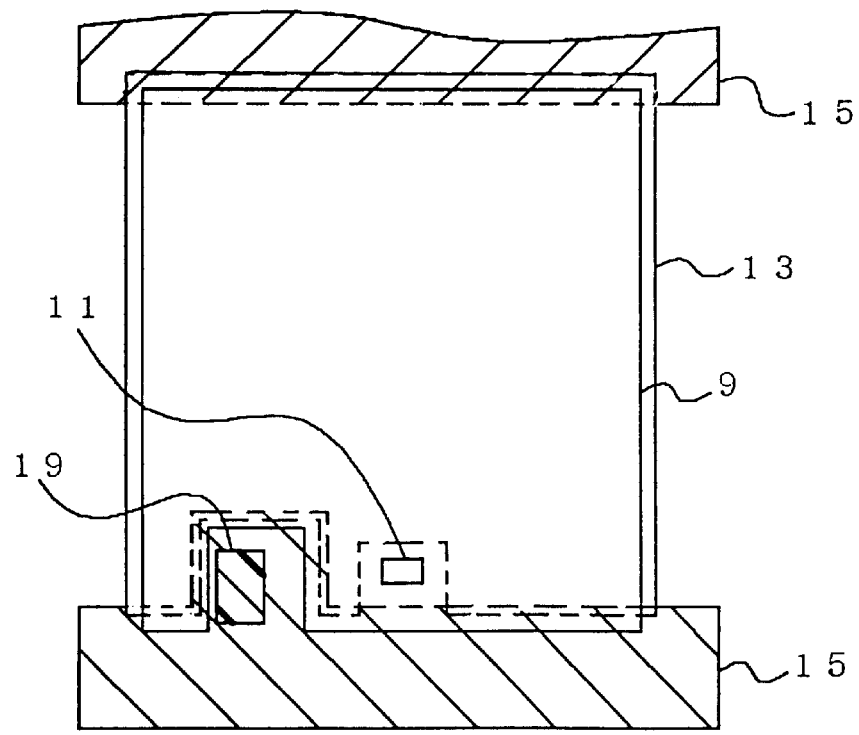
FIG. 11 is a plane view showing the relation between a pixel electrode, a color filter, a black matrix and a column spacer forming part of the layout on the active matrix substrate.
Figure 12:
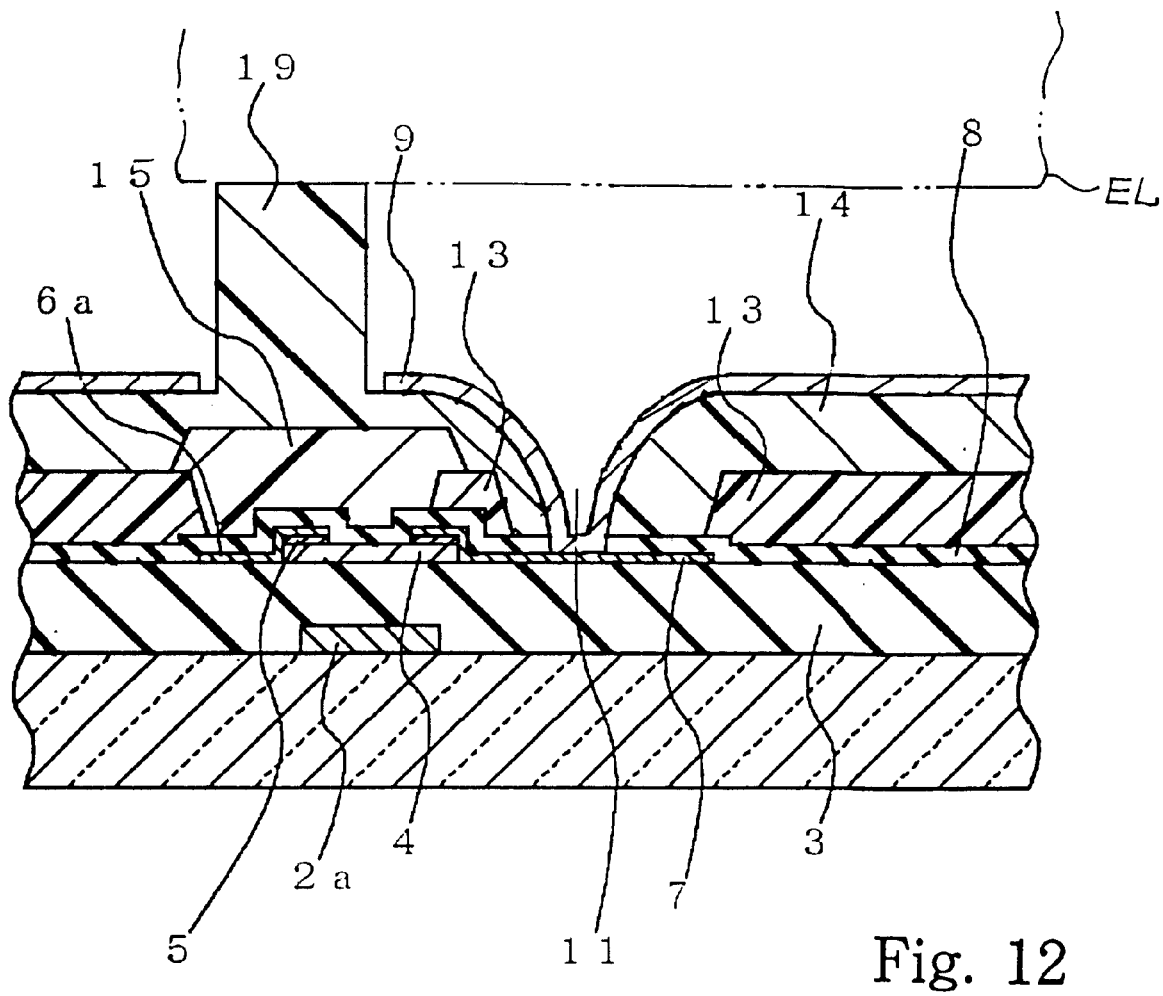
FIG. 12 is a cross sectional view taken along line A–A' of FIG. 10 and showing the structure of the active matrix substrate.

Turning to FIGS. 10, 11 and 12 of the drawings, the active matrix substrate includes a transparent insulating plate. Though not shown in the figures, an orientation layer is formed over the pixel electrodes. The gate lines 2b are patterned on the transparent insulating substrate at intervals, and extend in a direction of row. The gate electrodes 2a project from the gate lines 2b at intervals. The transparent insulating plate, the gate lines 2b and the gate electrodes 2a are covered with the gate insulating layer 3. The gate insulating layer 3 is omitted from FIGS. 10 and 11 for clearly showing the layout. The source lines 6b are patterned on the gate insulating layer 3 at intervals, and extend in a direction of column. The source electrodes 6a project from the source lines 6b at intervals. Adjacent two gate lines 2b and adjacent two source lines 6b define a rectangular region, and each pixel is assigned to a space over and under the rectangular region. A semiconductor layer 4 and a drain electrode 7 are patterned in each rectangular region, and the semiconductor layer 4 is partially overlapped with the source electrode 6a and the drain electrode 7 through ohmic contact layers 5.

The semiconductor layer 4 is located over the associated gate electrode 2a. The source electrode 6a is spaced from the drain electrode 7 on the semiconductor layer 4, and a conductive channel is created in the semiconductor layer 4 between the source electrode 6a and the drain electrode 7. The gate electrode 2a, the gate insulating layer 3, the semiconductor layer 4, the source electrode 6a and the drain electrode 7 as a whole constitute the thin film field effect transistor 10. The thin film field effect transistors are called as "channel etched thin film field effect transistor", because the ohmic contact layers are removed from the are over the conductive channel.

The thin film field effect transistors 10 and the exposed surface of the gate insulating layer 3 are covered with a passivation layer 8. Color filters 13 are patterned on the passivation layer 8, and are selectively colored in red, green and blue. Photo-shield black matrix 15 is further patterned on the passivation layer 8. The photo-shield black matrix 15 is located over the gate lines 2b and the gate electrodes 2a, and is indicated by hatching in FIG. 11. The photo-shield black matrix 15 prohibits back light from passing through the gap between the pixel electrodes 9.

The color filters 13 and the photo-shield black matrix 15 are covered with an overcoat layer 14, and contact holes 11 are formed in the overcoat layer 14 and the passivation layer 8. The contact holes 11 pass through openings defined by the color filters 13. As will be better seen in FIG. 11, the periphery of the color filter 13 is partially drawn back, and the opening takes place. The contact hole 11 passes through the overcoat layer 14 in the opening. The contact hole is offset from the photo-shield black matrix 15. The drain electrodes 7 are exposed to the contact holes 11, respectively. The pixel electrodes 9 are patterned on the overcoat layer 14, and are held in contact through the contact holes 11 with the drain electrodes 7, respectively.

Column spacers 19 project from the overcoat layer 14 through gaps between the adjacent pixel electrodes 9. In this instance, the column spacers 19 are located over the thin film field effect transistors 10, respectively. The column spacers 19 are arranged at regular intervals, and the counter substrate EL is spaced from the active matrix substrate by a constant gap by virtue of the column spacers 19. The column spacers 19 are integral with the overcoat layer 14, and are hardly separated from the overcoat layer 14.

As will be understood from the foregoing description, the active matrix substrate implementing the first embodiment has the column spacers 19 integral with the overcoat layer 14. Even though the orientation layer is subjected to the rubbing, the column spacers 19 are hardly separated from the overcoat layer 14, and exactly create the gap between the active matrix substrate and the counter substrate EL. The photo-shield black matrix 15 does not permit the black light to pass the gaps between the pixel electrodes 9, and the active matrix liquid crystal display panel achieves a high contrast.

The active matrix substrate implementing the first embodiment is fabricated through a process shown in FIGS. 13A to 13H. The process starts with preparation of the transparent insulating plate 1. In this instance, the transparent insulating plate 1 is formed of glass. Conductive metal such as, for example, Al, Mo or Cr is deposited to 100 nanometers to 400 nanometers thick over the transparent insulating plate 1 by using a sputtering technique. A photoresist etching mask (not shown) is patterned on the conductive metal layer by using the photo-lithographic techniques, and the conductive metal layer is selectively etched away so as to be formed into the gate lines, the gate electrodes 2a and the gate terminals.

Subsequently, silicon nitride, amorphous silicon and heavily-doped n-type amorphous silicon are successively deposited to 400 nanometers thick, 300 nanometers thick and 50 nanometers thick over the entire surface of the resultant structure by using a plasma-assisted chemical vapor deposition. The silicon nitride layer serves as the gate insulating layer 3. The amorphous silicon layer is laminated on the gate insulating layer, and the heavily-doped n-type amorphous silicon layer is laminated on the amorphous silicon layer.

A photo-resist etching mask (not shown) is patterned on the heavily-doped n-type amorphous silicon layer by using the photo-lithographic techniques, and the heavily-doped n-type amorphous silicon layer and the amorphous silicon layer are partially etched away so as to be formed into the semiconductor layer 4 and the heavily-doped n-type amorphous silicon strip.

Conductive metal such as, for example, Mo or Cr is deposited to 100 nanometers to 200 nanometers thick over the entire surface of the resultant structure by using the sputtering technique. A photo-resist etching mask (not shown) is patterned on the conductive metal layer by using the photo-lithographic techniques, and the conductive metal layer is partially etched so as to be formed into the source lines, the source electrodes 6a, the drain electrodes 7 and the data terminals. The heavily-doped n-type amorphous silicon strip is partially etched away so as to expose the semiconductor layer 4 to the gap between the source electrode 6a and the drain electrode 7. Thus, the source electrode 6a and the drain electrode 7 are held in contact through the ohmic contact layer of the heavily-doped n-type amorphous silicon with the semiconductor layer 4.

Figure 13A:
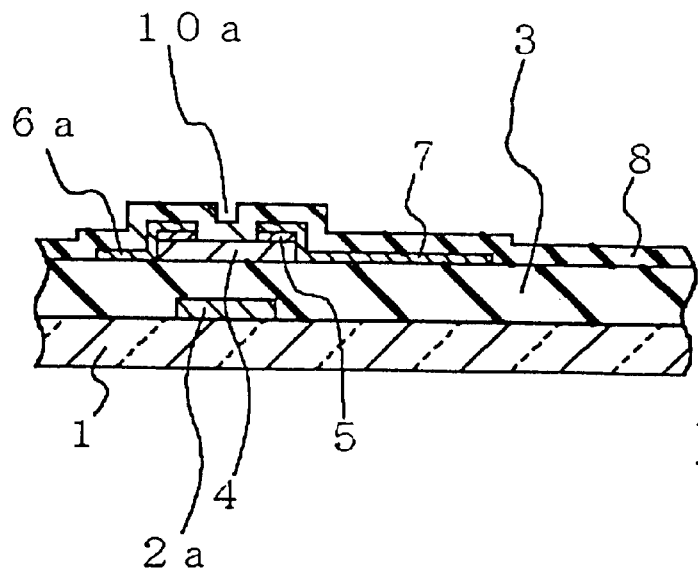
FIGS. 13A to 13H are cross sectional views showing a process for fabricating the active matrix substrate according to the present invention.

Subsequently, inorganic material such as silicon nitride is deposited to 100 nanometers to 200 nanometers thick over the entire surface of the resultant structure by using the plasma-assisted chemical vapor deposition. The silicon nitride forms the passivation layer 8, and the back channel of the thin film field effect transistor 10, the source electrode 6a, the source line (not shown), the drain electrode 7 and the gate terminal (not shown) are covered with the passivation layer 8 as shown in FIG. 13A.

Figure 13B:
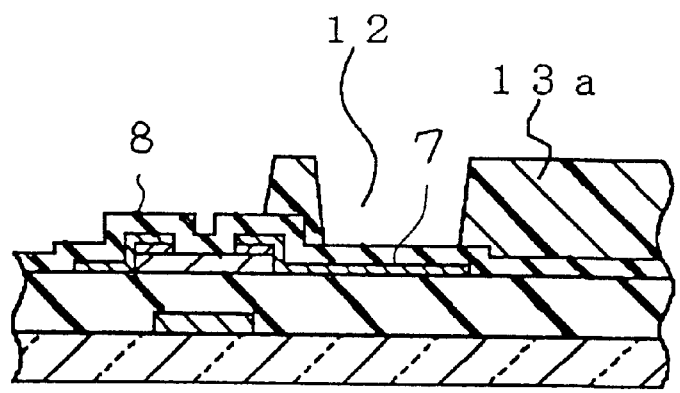

Subsequently, photo-cured negative color resist is spun onto the resultant structure. In this instance, the photo-cured negative color resist is in the acrylic resin system, and red pigment is dispersed therein. The spin coater is regulated in such a manner that the photo-cured negative color resist is 1.2 microns thick. The photo-cured negative color resist is pre-baked on a hot plate at 80 degrees in centigrade for 2 minutes. The photo-cured negative color resist is exposed to image-carrying light, and a latent image is formed in the photo-cured negative color resist. The latent image is developed in developing solution containing tetramethyl ammoniumhydroxide usually abbreviated as TMAH. Then, the red filter 13a is left on the passivation layer 8. The red filter 13a has an opening 12 over the drain electrode 7. The opening 12 is wider than the contact hole 11. The red filter 13a is post baked in a clean oven (not shown) at 220 degrees in centigrade for 60 minutes so as to be cured. The resultant structure is shown in FIG. 13B.

Figure 13C:
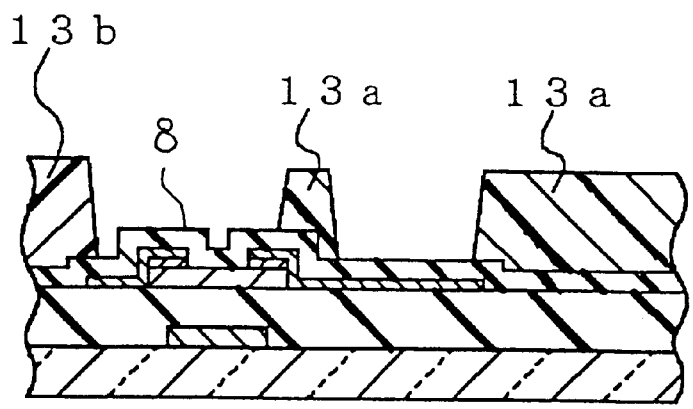

The green filter 13b is patterned on the passivation layer 8 as similar to the red filter 13a, and is post baked at 220 degrees in centigrade for 60 minutes. The resultant structure is shown in FIG. 13C.

Figure 13D:
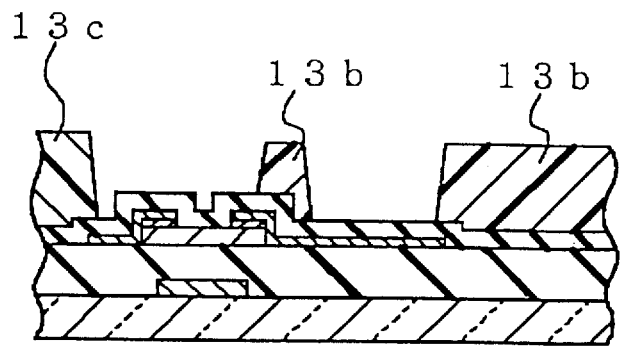
Figure 13E:
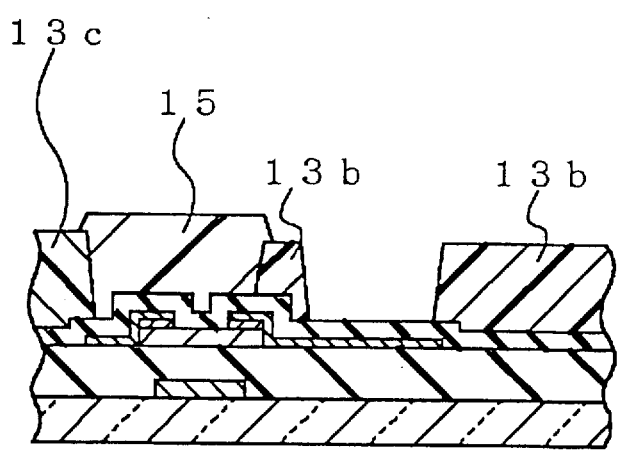

The blue filter 13c is patterned on the passivation layer 8 as similar to the red filter 13a and the green filter 13b as shown in FIG. 13D. Black pigment dispersed acrylic photo-sensitive resin or carbon-containing photo-sensitive acrylic resin is regulated to 20 cp, and is spun onto the resultant structure. The spin coater is regulated in such a manner that the photo-sensitive acrylic resin forms a layer of 1.5 microns thick. The photo-sensitive acrylic resin is patterned into the black matrix 15. The black matrix 15 does not occupy the area exposed to the opening 12. The resultant structure is shown in FIG. 13E.

Subsequently, photo-sensitive transparent acrylic resin is spread over the entire surface. The photo-sensitive transparent acrylic resin layer creates a flat upper surface, and have the thickness equal to the total of the thickness of the overcoat layer 14 and the height of the column spacers 19. If the cell gap between the active matrix substrate and the counter substrate EL and the overcoat layer 14 are to be 4.5 microns and 3 microns thick, the column spacers 19 are to be 4.5 microns high, and, accordingly, the photo-sensitive transparent acrylic resin layer is regulated to 7.5 microns thick.

The photo-sensitive transparent acrylic resin is pre-baked, and an image for the column spacers 19, an image for the overcoat layer 14 and the contact hole 11 are transferred from a photo-mask to the photo-sensitive transparent acrylic resin layer. Thus, three pattern image, i.e., the pattern image for the column spacers 19, the pattern image for the overcoat layer 14 and pattern image for the contact hole 11 are concurrently transferred to the photo-sensitive transparent acrylic resin layer by using a half-tone exposure technique.

Figure 14:
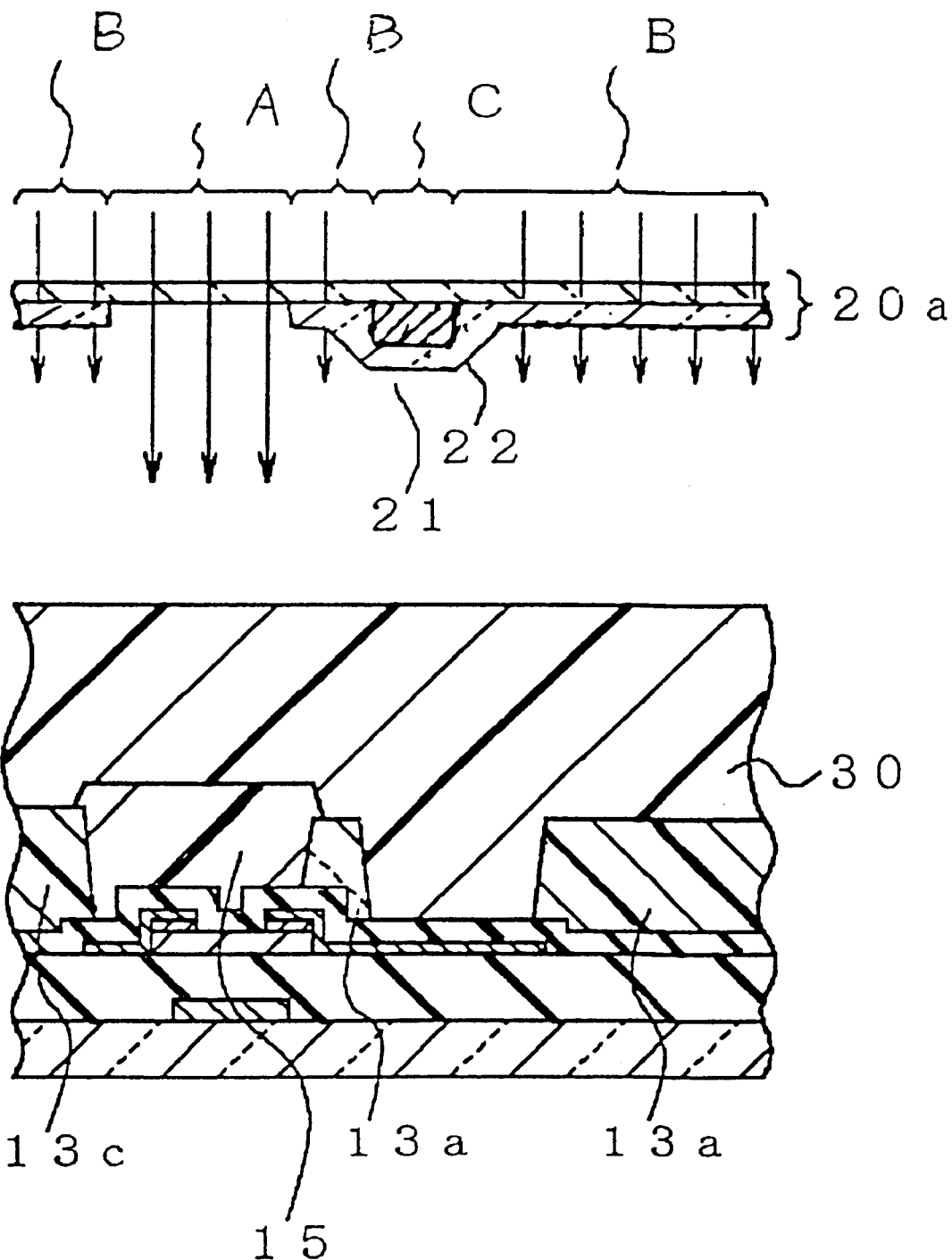
FIG. 14 is a cross sectional view showing a half-tone mask aligned with a photo-sensitive layer.

The half-tone exposure technique is illustrated in FIG. 14. A negative photo-sensitive acrylic resin layer 30 is assumed to be used as the photo-sensitive layer. A half-tone mask 20a is used for the concurrent pattern transfer. The half-tone mask 20a has a photo-shield meal layer 21 patterned on a transparent plate, and the photo-shield metal layer 21 is covered with a semi-transparent layer 22. The transparent plate, the semi-transparent layer 22 and the photo-shield metal layer 21 divide the half-tone mask 20a into regions A, B and C. Only a part of the transparent plate constitutes the region A, and the transmittance of region A is 100 percent. On the other hand, the photo-shield metal layer 21 is formed in the region C, and the transmittance of region C is zero percent. The transparent plate and the semi-transparent layer 22 constitute regions B, and the transmittance of regions is greater than zero percent and less than 100 percent.

Figure 15:
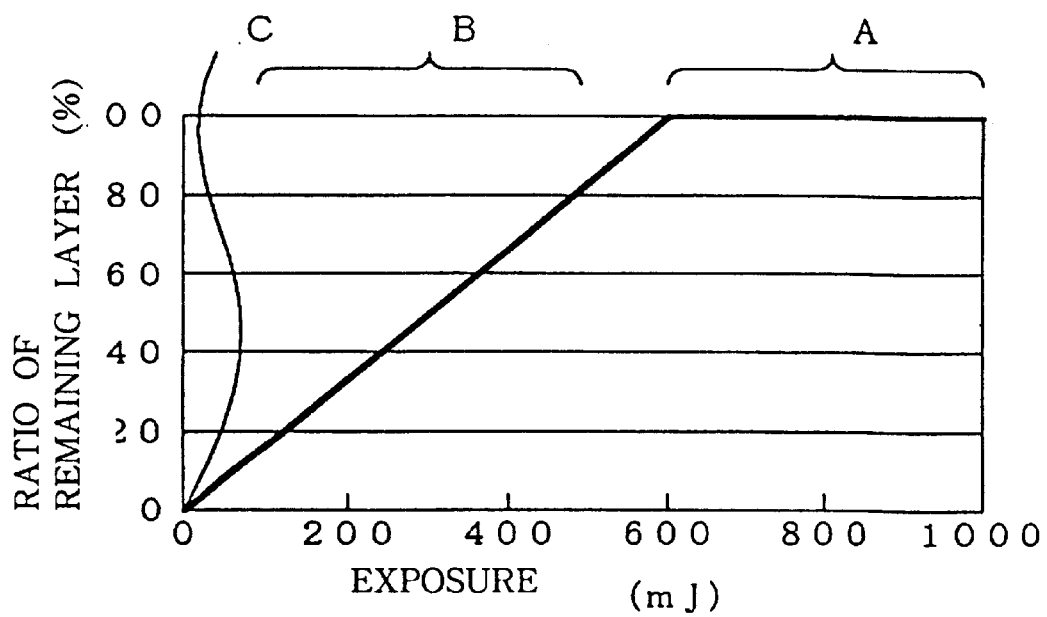
FIG. 15 is a graph showing a ratio of remaining photo-sensitive layer in three different regions.
Figure 16:
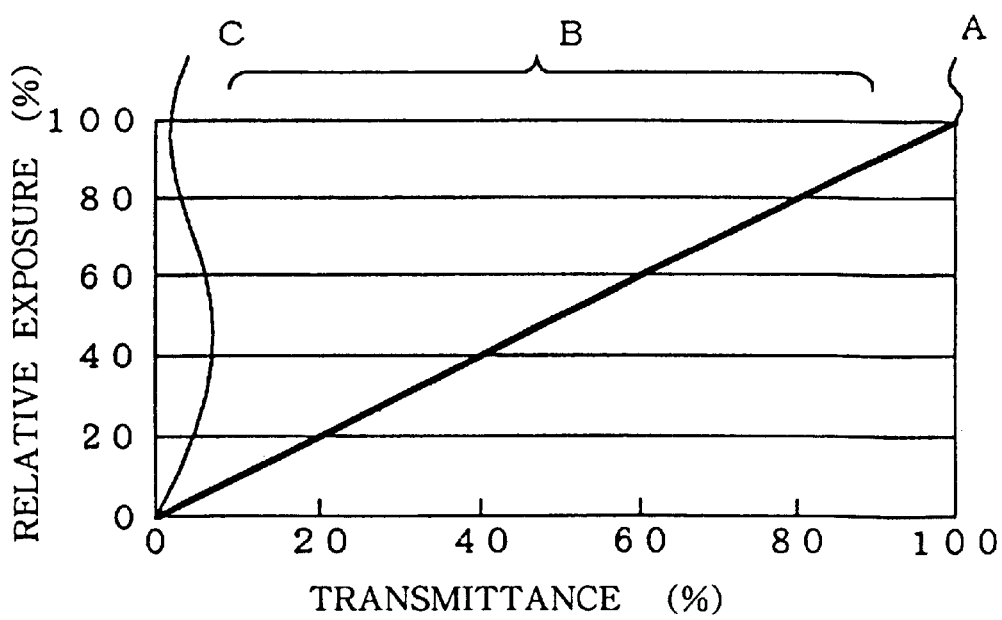
FIG. 16 is a graph showing a relation between the transmittance and a relative exposure.

The negative photo-sensitive acrylic resin layer 30 is assumed to be exposed to the light passing through the half-tone mask 20a. When the exposure is 600 mJ, the negative photo-sensitive acrylic resin layer 30 remains after the development as shown in FIG. 15. This is because of the fact that the relative exposure is linearly increased together with the transmittance as shown in FIG. 16. In order to concurrently form the column spacers 19, the overcoat layer 14 and the contact hole 11 from the negative photo-sensitive acrylic resin layer, it is necessary to regulate the transmittance on the half-tone mask 20a to appropriate values depending upon the remaining thickness. The column spacers 19 and the overcoat layer 14 are to be 7.5 microns high and 3 microns thick. The overcoat layer 14 is assigned to the region B, and the column spacers 19 are assigned to the region A. The contact hole 11 is assigned to the region C. The relative exposure in the region B is 40 percent at transmittance of 40 percent, and the remaining thickness is about 3 microns. On the other hand, the relative exposure in the region A is 100 percent at the transmittance of 100 percent, and the remaining thickness is 7.5 microns. The relative exposure in the region C is zero percent at the transmittance of zero percent, and the remaining thickness is zero. For this reason, the transmittance in regions B is to be regulated to 40 percent.

Figure 13F:
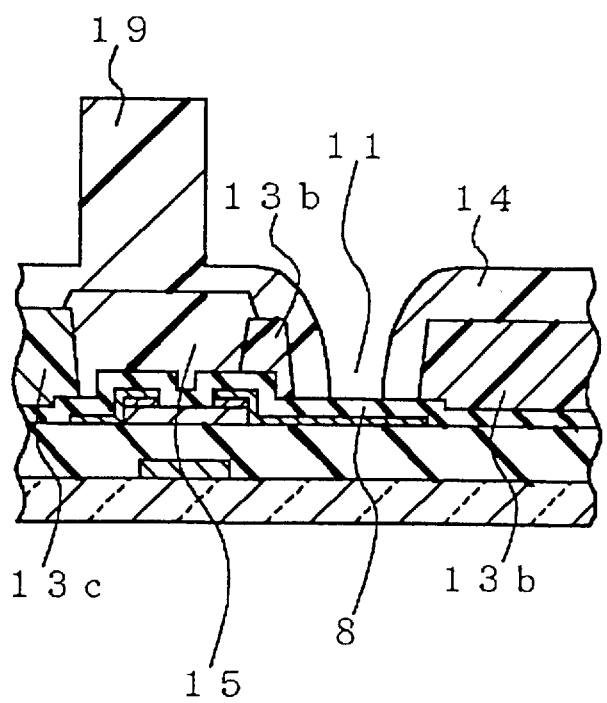

Using the half-tone mask 20a, the pattern image for the column spacers 19 and the pattern image for the overcoat layer 14 are concurrently transferred from the half-tone mask 20a to the photo-sensitive acrylic resin layer, and latent images are formed therein. The latent images are developed, and the remaining photo-sensitive acrylic resin layer is post baked at 220 degrees in centigrade for 60 minutes. The remaining photo-sensitive acrylic resin layer provides the column spacers 19, the overcoat layer 14 and the contact hole 11 as shown in FIG. 13F.

Figure 13G:
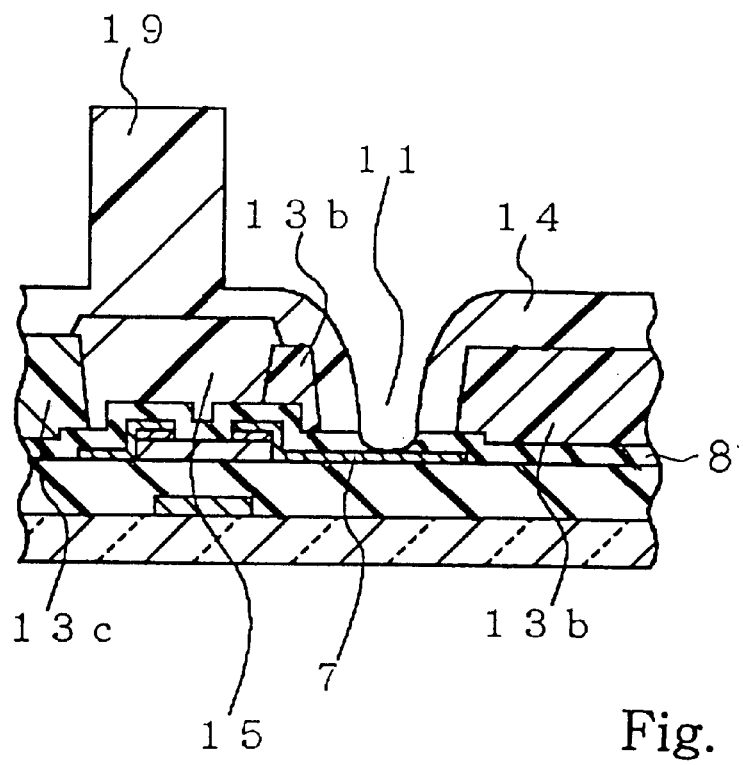
Figure 13H:
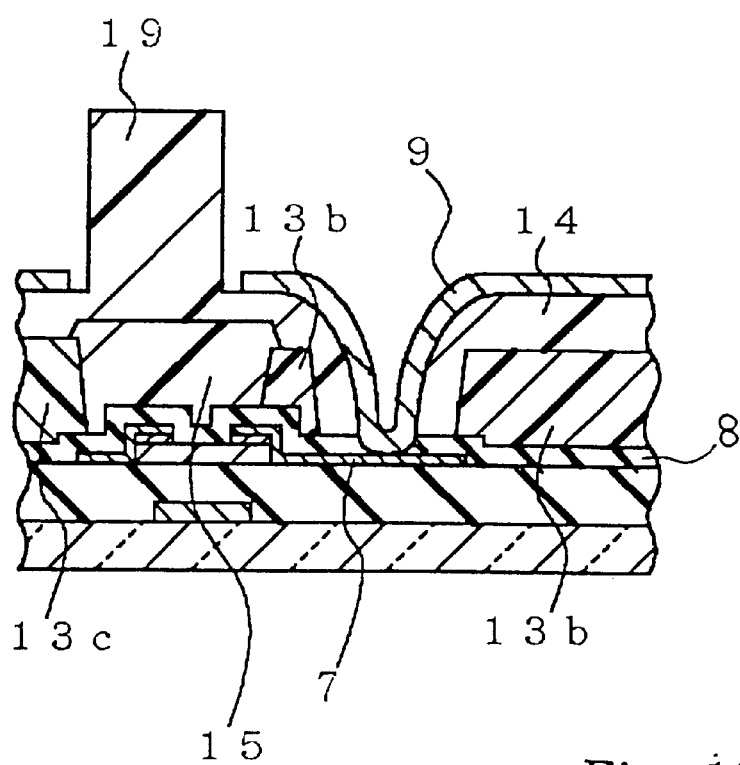

A part of the passivation layer 8 is exposed to the contact hole 11, and is etched away as shown in FIG. 13G. Then, the drain electrode 7 is exposed to the contact hole 11. The resultant structure is shown in FIG. 13G.

Subsequently, transparent conductive material such as, for example, indium tin oxide is deposited over the entire surface of the resultant structure. The indium tin oxide layer conformably extends over the resultant structure, and is held in contact with the drain electrode 7 through the contact hole 11. Thicker the indium tin oxide layer, the better the step coverage. However, the indium tin oxide layer is to be patterned. In this instance, the indium tin oxide layer is regulated to 100 nanometers thick. A photo-resist etching mask (not shown) is patterned on the indium tin oxide layer by using the photo-lithographic techniques, and the indium tin oxide layer is selectively etched. Upon completion of the etching, the pixel electrode 9 is left on the overcoat layer 14.

The active matrix substrate is assembled with the counter substrate EL, and the liquid crystal 18 is introduced into the gap between the active matrix substrate and the counter substrate EL.

In the process described hereinbefore, the thickness of the red/green/blue filters 13a/13b/13c and the thickness of the black matrix 15 are dependent on the material used therefor. When the color filters 13a/13b/13c and the black matrix 15 are assumed to be formed of standard synthetic resin presently used in the field of the liquid crystal display panel, the synthetic resin for the color filters 13a/13b/13c is spread so as to be 1.0 micron to 2.5 microns thick, and the synthetic resin for the black matrix 15 is spread also to have the thickness of 1.0 micron to 2.5 microns. Although the thickness of the photo-sensitive resin for the overcoat layer/column spacers 14/19 is dependent on the height of the column spacers 19, the photo-sensitive layer ranges from 5.0 microns thick to 8.0 microns thick for a standard liquid crystal display panel.

In the first embodiment, the gate lines 2b, the gate electrodes 2a, the gate insulating layer 3, the semiconductor layers 4, the source lines 6b, the source electrodes 6a and the drain electrodes 7 as a whole constitute a multiple layered device structure. The red filters 13a, the green filters 13b, the blue filters 13c and the black matrix 15 as a whole constitute an optically modulating structure. The overcoat layer 14 and the column spacers 19 as a whole constitute a protective structure. The column spacer 19 serves as a protrusion.

The first advantage is that the column spacers 19, the overcoat layer 14 and the contact hole 11 are formed through the single photo-lithography. In other words, the fabrication process is simplified, and the high-precision large-sized liquid crystal display panel is fabricated at low production cost.

The second advantage is the high production yield. The column spacers 19 are hardly separated from the overcoat layer 14 in the rubbing, because the column spacers 19 and the overcoat layer 14 have the monolithic structure. The half-tone mask 20a permits the manufacturer to form the monolithic structure from the photo-sensitive layer.

The third advantage is the independence of the thickness of the color filters 13a/13b/13c from the height of the column spacers 19. The manufacturer is allowed to adjust the color filters 13a/13b/13c to appropriate values of thickness, and the color filters 13a/13b/13c are free from the deviation from target chromaticity.

Finally, the black matrix 15 prevents the pixels from leakage light.

Second Embodiment

One of the particular features of the second embodiment is directed to a slit mask instead of the half-tone mask 20a. For this reason, description is hereinbelow focused on a process for fabricating an active matrix substrate. The active matrix substrate fabricated through the process implementing the second embodiment is similar to the active matrix substrate of the first embodiment.

The process sequence implementing the second embodiment is similar to that of the first embodiment until the patterning step for the black matrix shown in FIG. 13E.

Figure 17:
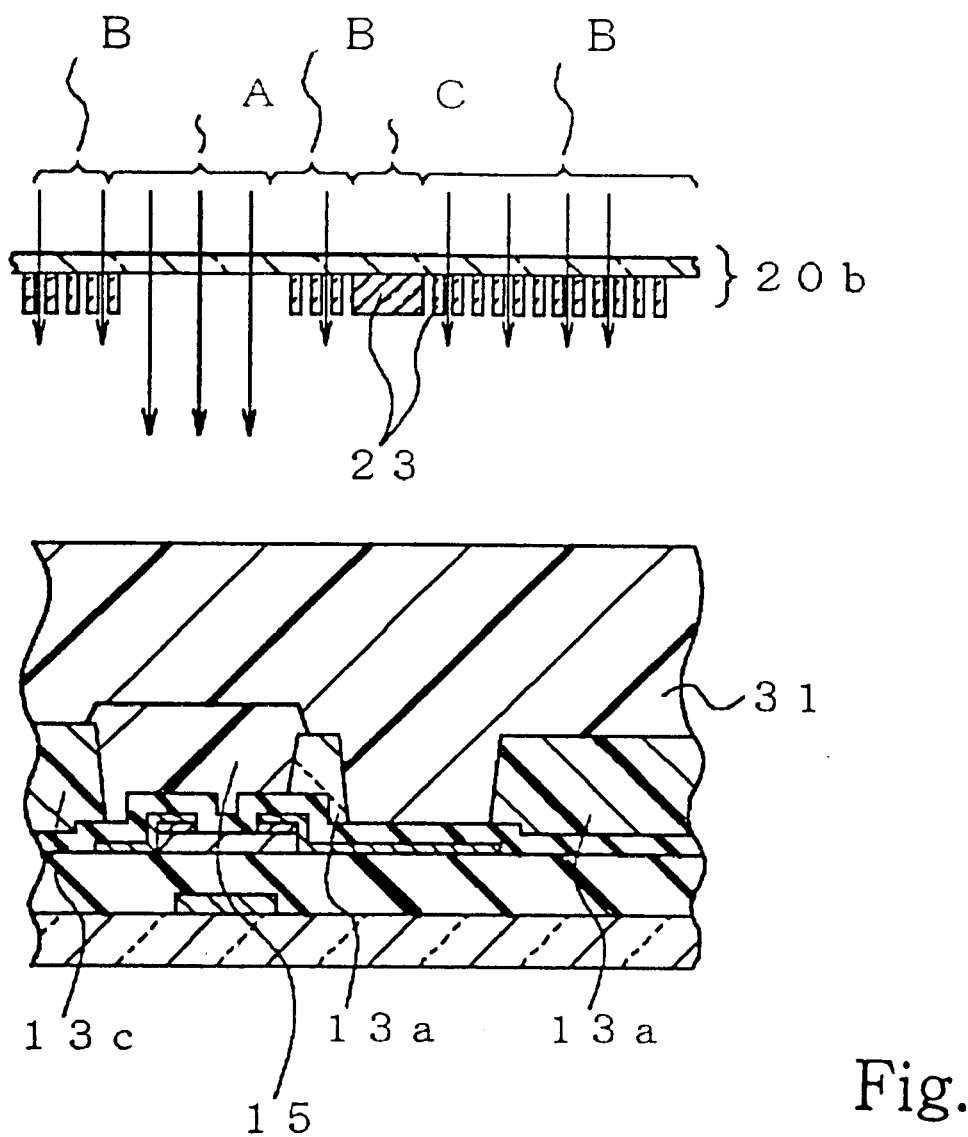
FIG. 17 is a cross sectional views showing a pattern transfer step of another process for fabricating an active matrix substrate according to the present invention.

Upon completion of the step shown in FIG. 13E, a negative photo-sensitive acrylic resin is spread over entire surface of the resultant structure, and forms a negative photo-sensitive acrylic resin layer 31 (see FIG. 17). The resultant structure is aligned with a slit mask 20b in an aligner. Three different pattern images are formed in the slit mask 20b. In detail, a transparent plate is partially covered with a photo-shield metallic layer 23. However, slits are formed in a part of the photo-shield metallic layer 23 at predetermined intervals. A part of the transparent plate is uncovered with the photo-shield metallic layer 23, and is labeled with "A". The transmittance of region A is 100 percent. On the other hand, any slit is not formed in a part of the photo-shield metallic layer 23, and is labeled with "C". The transmittance of region B is zero. On the other hand, plural slits are formed in region "B" of the photo-shield metallic layer 23, and the transmittance of region B is dependent on the density of the slits. In other words, the transmittance of region B is variable together with the density of the slits. The region A has a shape corresponding to the pattern image for the column spacers 19, and the region C is shaped into a configuration corresponding to contact holes 11. The region B is corresponding to the pattern image for the overcoat layer 14, and is adjusted to an appropriate transmittance for the thickness of the overcoat layer 14.

Using the slit mask 20b, the negative photo-sensitive acrylic resin layer 31 is exposed to light through the slit mask 20b. Then, the three patterns are transferred to the negative photo-sensitive acrylic resin layer 31, and latent images are formed therein. The exposure light makes the part of the negative photo-sensitive acrylic resin layer 31 under the region A another part under the region C insoluble and soluble, respectively. However, the remaining part of the negative photo-sensitive acrylic resin layer 31 is under the region B, and becomes partially soluble. When the latent images are developed, the column spacers 19m the contact holes 11 and the overcoat layer 14 are formed from the negative photo-sensitive acrylic resin layer 31 as shown in FIG. 13F.

After the formation of the column spacers, contact holes and overcoat layer 19/11/14, the process sequence returns to the above-described process sequence implementing the first embodiment.

The active matrix substrate and the process achieve all the advantages of the first embodiment.

Third Embodiment

Figure 18A:
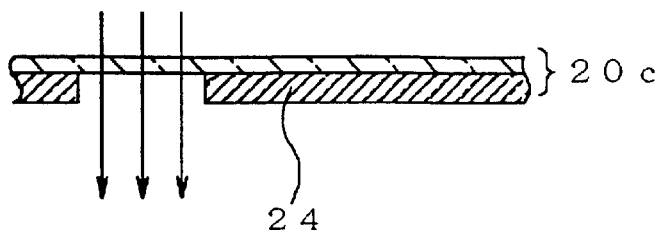
FIGS. 18A and 18B are cross sectional views showing a pattern transfer step of yet another process for fabricating an active matrix substrate according to the present invention.
Figure 18A:
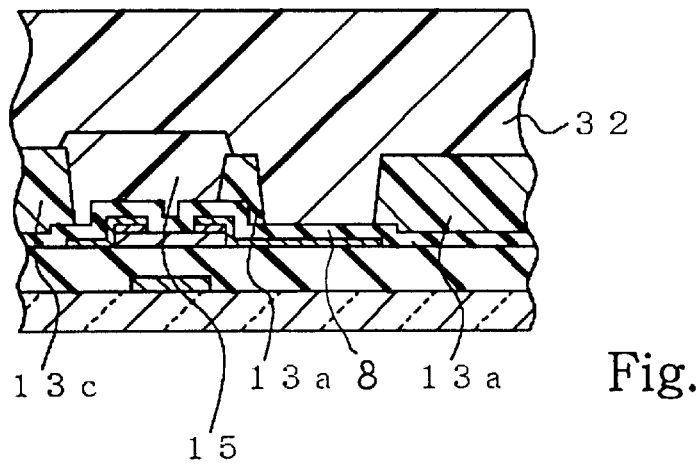
Figure 18B:
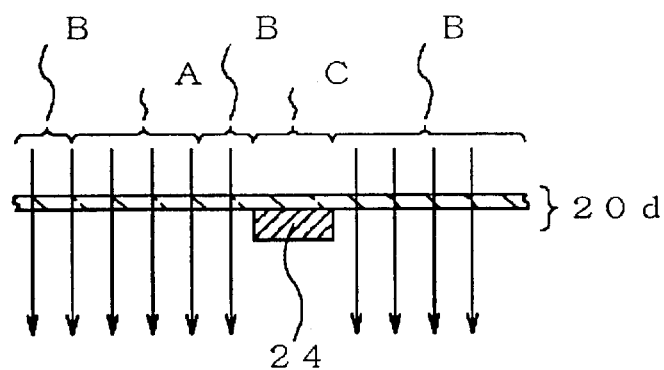
Figure 18B:
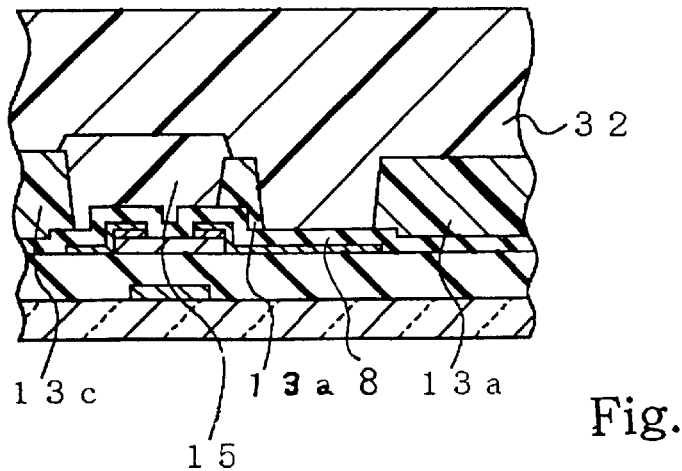

FIGS. 18A and 18B show a pattern transfer step of yet another process for fabricating an active matrix substrate.

The process implementing the third embodiment is similar to the process of the first embodiment except the pattern transfer step. For this reason, description is focused on the pattern transfer step.

After the black matrix 15 is patterned on the passivation layer 8, a negative photo-sensitive acrylic resin is spread over the entire surface of the resultant structure, and forms a negative photo-sensitive acrylic resin layer 32. The negative-sensitive acrylic resin layer 32 is exposed to light passing through a photo-mask 20c as shown in FIG. 18A. The photo-mask 20c has a photo-shield metallic layer 24 on a transparent plate except regions over the area where the column spacers are to be formed. In other words, the photo-shield metallic layer 24 prevents the area assigned to the overcoat layer 14 and the area assigned to the contact holes 11 from the exposure light. The exposure light is regulated to 300 mJ. A latent image for the column spacers is produced in the negative photo-sensitive acrylic resin layer 32.

Subsequently, the photo-mask 20c is replaced with a photo-mask 20d. The photo-mask 20d has a transparent plate partially covered with a photo-shield metallic layer 24. The metallic layer prevents the area assigned to the contact holes 11 from the exposure light. However, the area assigned to the column spacers 19 and the area assigned to the overcoat layer 14 are exposed to the light. The exposure light is adjusted to 300 mJ. The negative photo-sensitive acrylic resin layer 32 is exposed to the light passing through the photo-mask 20d as shown in FIG. 18B, and another latent image is further produced in the negative photo-sensitive acrylic resin layer 32.

Since the area assigned to the column spacers 19 are twice exposed to the light, the portion of the negative photo-sensitive acrylic resin layer becomes insoluble to developing solution. However, the portion assigned to the overcoat layer 14 is exposed to the light once, and becomes partially insoluble. The portion assigned to the contact holes 11 are prevented from the exposure light, and is still soluble.

Subsequently, the latent images are developed. The column spacers 19, the overcoat layer 14 and the contact holes 11 are formed as shown in FIG. 13F.

The active matrix substrate produced through the process implementing the third embodiment is assembled with the counter substrate EL, and liquid crystal fills the gap between the active matrix substrate and the counter substrate EL as similar to the first embodiment.

The active matrix substrate and the process implementing the third embodiment achieve all the advantages of the first embodiment.

Fourth Embodiment

FIGS. 19A to 19E show essential steps of still another process for fabricating an active matrix substrate implementing the present invention. The process sequence implementing the fourth embodiment is similar to the process sequence implementing the first embodiment until the formation of the black matrix 15.

After the formation of the black matrix 15, positive photo-sensitive resin is spread over the entire surface of the resultant structure, and is pre-baked at 90 degrees in centigrade for 2 minutes. The black matrix 15 and the color filters 13a/13b/13c are covered with a positive photo-sensitive resin layer 33.

Figure 19A:
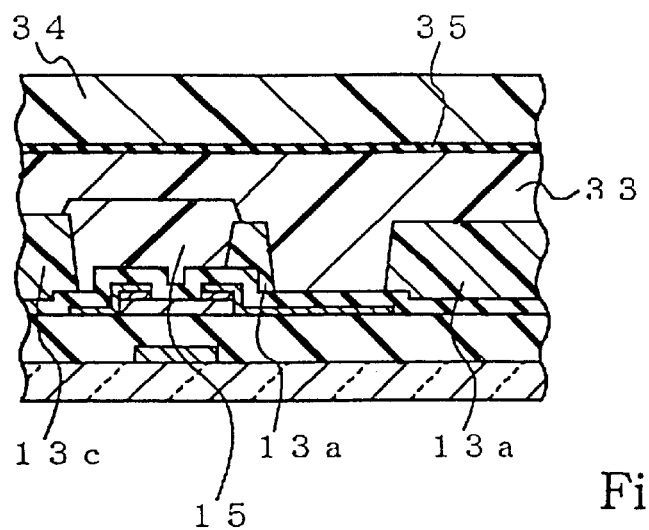
FIGS. 19A to 19E are cross sectional views showing essential steps of still another process for fabricating an active matrix substrate according to the present invention.

Subsequently, negative photo-sensitive resin is spread over the entire surface of the positive photo-sensitive resin layer 33, and is pre-backed at 90 degrees in centigrade for 2 minutes. A negative photo-sensitive resin layer 34 is laminated on the positive photo-sensitive resin layer 33, and a mixing layer 35 takes place between the positive photo-sensitive resin layer 33 and the negative photo-sensitive layer 34. The mixing layer is formed of mixture between the positive photo-sensitive resin and the negative photo-sensitive resin at the boundary therebetween as shown in FIG. 19A.

Figure 19C:
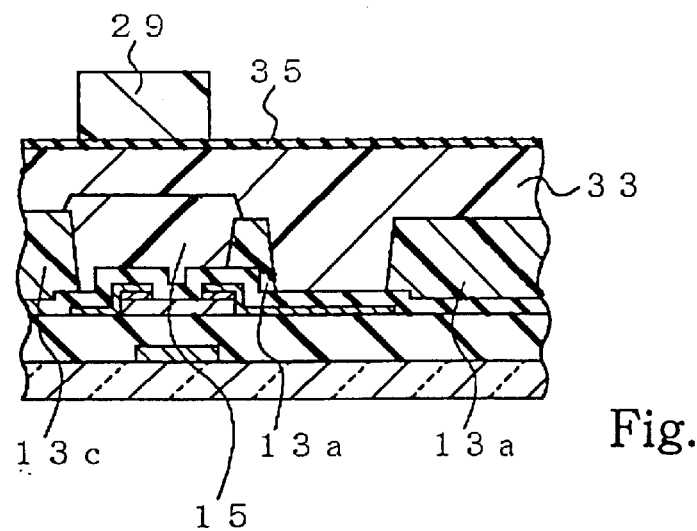
Figure 19E:
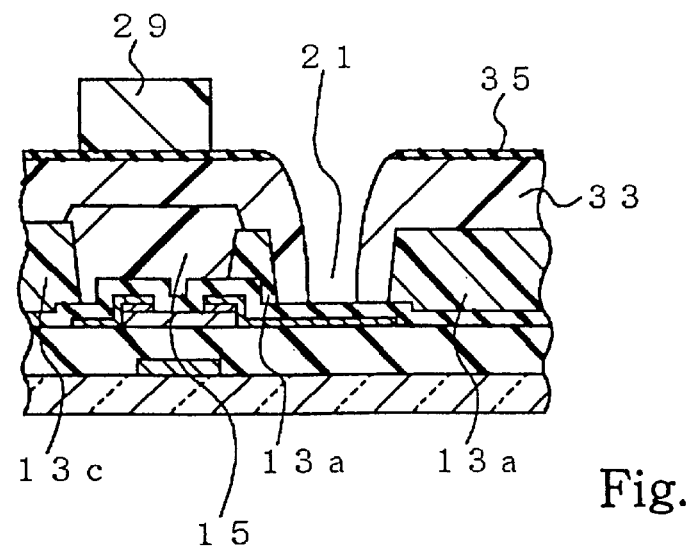
Figure 19B:
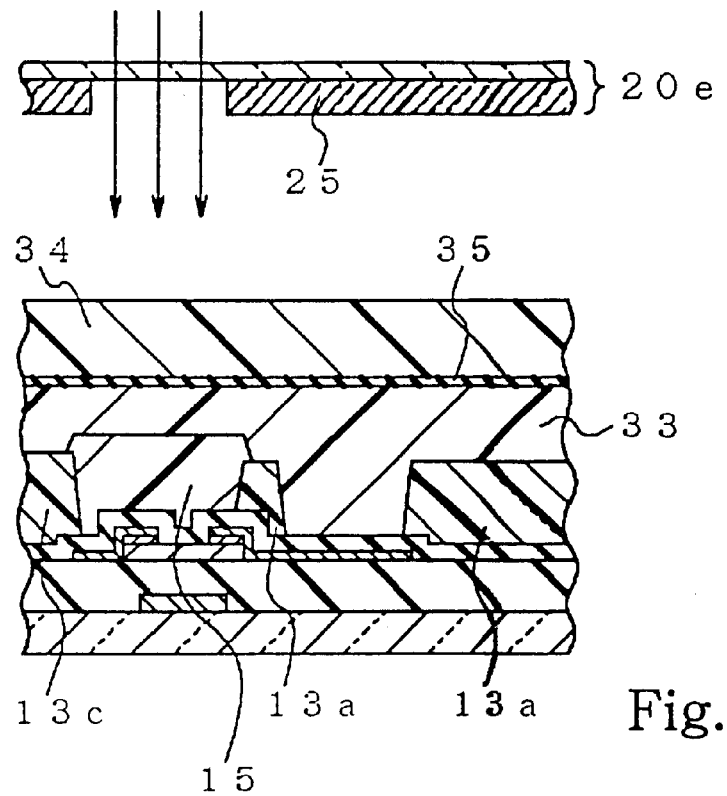

Subsequently, a pattern image for column spacers 29 is transferred from a photo-mask 20e to the negative photo-sensitive resin layer 34 as shown in FIG. 19B, and a latent image is produced in the negative photo-sensitive resin layer 34. The latent image is developed. Only the negative photo-sensitive resin layer 34 is partially removed, and the mixing layer 35 is exposed. Thus, the column spacers 29 are patterned on the mixing layer 35 as shown in FIG. 19C.

Figure 19D:
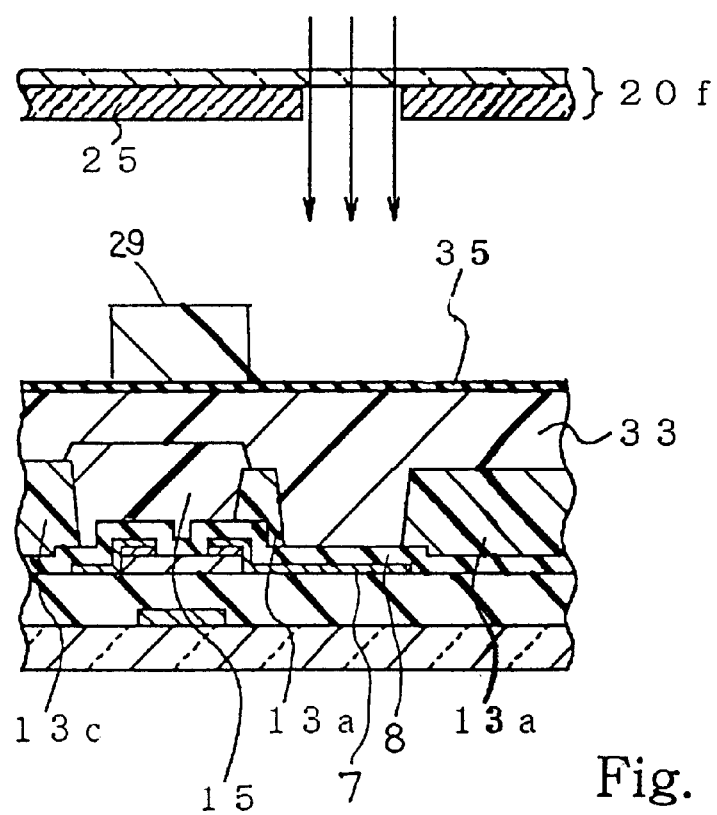

Subsequently, a pattern image for contact holes 21 is transferred from a photo-mask 20f to the positive photo-sensitive resin layer 33 as shown in FIG. 19D, and a latent image is produced in the positive photo-sensitive resin layer 33. The latent image is developed so as to form contact holes 21 as shown in FIG. 19E. The remaining positive photo-sensitive resin layer 33 and the mixing layer 35 form in combination an overcoat layer.

The passivation layer 8 is partially removed, and the drain electrode 7 is exposed to the contact hole 21. Transparent material is deposited over the entire surface of the resultant structure, and the transparent material layer is patterned into the pixel electrodes 9. Though not shown in the drawings, an orientation layer is formed over the pixel electrodes 9, and liquid crystal is injected into the gap between the active matrix substrate and the counter substrate. Thus, after the formation of the contact holes 21, the process sequence is similar to that of the first embodiment.

The active matrix substrate and the process implementing the fourth embodiment achieve all the advantages of the first embodiment.

As will be appreciated from the foregoing description, the column spacers 19/29 are integral with the overcoat layer 14 or 33/35 according to the present invention, and, accordingly, are hardly separated from the overcoat layers 14 or 33/35. Even though the orientation layer is subjected to the rubbing, the column spacers 19/29 are not broken. When the active matrix substrate is assembled with the counter substrate, the column spacers 19/29 keep the counter substrate spaced by a predetermined distance, and the production yield is enhanced.

Moreover, the height of the column spacers 19/29 is independent of the thickness of the color filters 13a/13b/13c, and any deviation from the target chromaticity does not take place. The black matrix 15 prevents the pixels from leakage light.

Although particular embodiments of the present invention have been shown and described, it will be apparent to those skilled in the art that various changes and modifications may be made without departing from the spirit and scope of the present invention.

For example, the column spacers may be located over selected ones of the thin film field effect transistors at regular intervals.

The contact hole 11 may pass through the photo-shield black matrix 15. Otherwise, the photo-shield black matrix 15 and the color filter 13 are partially cut away so as to permit the contact hole 11 to pass partly through the photo-shield black matrix 15 and partly through the color filter 13.

The present invention is applicable to any active matrix substrate having a pixel electrode connected through an organic planarization layer. Any color filter or any black matrix may not be under the organic planarization layer. Any switching element is available for the pixel. The switching element may be implemented by an MIM (Metal-Insulator-Metal) transistor or a diode. The inverted staggered thin film field effect transistors are used in the above-described embodiment. The inverted staggered thin film field effect transistors may be replaced with non-inverted staggered thin film field effect transistors, which have gate electrodes over the semiconductor layers. The colors may be different from the combination of red, green and blue.

An active matrix substrate may be modified for another kind of panel display.

What is claimed is:

1. An active matrix substrate forming a part of a liquid crystal display panel together with a counter substrate, comprising:

a transparent insulating plate having an upper surface;

an active multiple layered switching device laminated on said upper surface and connected to a pixel electrode;

a black matrix laminated on said active multiple layered switching device and a color filter formed below said pixel electrode; and a single overcoat layer laminated on said black matrix and said color filter, wherein said single overcoat layer comprises a photo-sensitive material and a portion of said single overcoat layer forms a column spacer extending above said black matrix to said counter substrate.

2. The active matrix substrate as set forth in claim 1, in which said single overcoat layer is formed of a single photo-sensitive material.

3. The active matrix substrate as set forth in claim 1, in which said single overcoat layer is formed of a first photo-sensitive material, a second photo-sensitive material, and a mixture layer formed of and between said first photo-sensitive material and said second photo-sensitive material.

4. The active matrix substrate as set forth in claim 1, in which said columnar spacer is formed of a first photo-sensitive material and a remaining portion of said single overcoat layer is formed of a second photo-sensitive material and a mixture layer.

5. The active matrix substrate as set forth in claim 3, in which said first photo-sensitive material and said second photo-sensitive material are a negative photo-sensitive resin and a positive photo-sensitive resin, respectively.

6. The active matrix substrate as set forth in claim 1, in which said active multiple layered switching device forms a thin film transistor, including:

a gate electrode that is selectively connected to a gate line, a semiconductor layer that is electrically insulated from said gate electrode and capacitively coupled to said gate electrode, a source electrode that is selectively connected to a source line and is electrically isolated from said gate line, and a drain electrode that is connected to said pixel electrode,
   wherein a first end and a second end of said semiconductor layer contacts said drain electrode and said source electrode of said thin film transistor, respectively, and
   said active multiple layered switching device further includes a gate insulating layer formed between said gate electrode and said semiconductor layer and a passivation layer covering said active multiple layered switching device.

7. The active matrix substrate as set forth in claim 6, in which said gate line and said gate electrode are formed on said upper surface of said transparent insulating plate and covered with said gate insulating layer, and said semiconductor layer, said source line, said source electrode and said drain electrode are sandwiched between said gate insulating layer and said passivation layer.

8. The active matrix substrate as set forth in claim 7, in which said color filter is patterned on said passivation layer and said black matrix is patterned on said passivation layer and located over said gate line and said gate electrode.

9. The active matrix substrate as set forth in claim 1, wherein said pixel electrode is formed over that portion of said single overcoat layer, which does not overlie said black matrix, and is connected to said drain electrode of said thin film transistor through an ohmic layer.

* * * * *